(12) United States Patent
Wada et al.

(10) Patent No.: US 8,063,499 B2
(45) Date of Patent: Nov. 22, 2011

(54) POWER-GENERATION CONTROL APPARATUS FOR IN-VEHICLE ELECTRIC ROTATING MACHINE

(75) Inventors: Noriyuki Wada, Chiyoda-ku (JP); Katsuyuki Sumimoto, Chiyoda-ku (JP); Jyunya Sasaki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 380 days.

(21) Appl. No.: 12/473,521

(22) Filed: May 28, 2009

(65) Prior Publication Data

US 2010/0194355 A1 Aug. 5, 2010

(30) Foreign Application Priority Data

Jan. 30, 2009 (JP) ................................ 2009-019981

(51) Int. Cl.
*F02D 29/06* (2006.01)

(52) U.S. Cl. ..................................................... 290/40 C
(58) Field of Classification Search ............... 290/40 C, 290/40 R, 40 B, 40 F
See application file for complete search history.

(56) References Cited

U.S. PATENT DOCUMENTS

| | | | | |
|---|---|---|---|---|
| 6,710,467 | B2 * | 3/2004 | Braun et al. | 290/40 B |
| 7,170,263 | B2 * | 1/2007 | Yamamoto et al. | 322/59 |
| 2007/0227499 | A1 * | 10/2007 | Asada et al. | 123/339.18 |

FOREIGN PATENT DOCUMENTS

JP 2002-315221 A 10/2002

* cited by examiner

*Primary Examiner* — Nguyen N Hanh
(74) *Attorney, Agent, or Firm* — Sughrue Mion, PLLC

(57) ABSTRACT

There can be performed the best power-generation control without enlarging the apparatus, deteriorating the reliability, and raising the cost. The power-generation control apparatus is provided with a power-generation amount suppression determination unit that determines whether or not to change a power-generation amount suppression level for suppressing the power-generation amount of the in-vehicle electric rotating machine, based on a present generation-voltage command value generated by a generated-voltage command unit and a generated-voltage past command value based on a past generated-voltage command value stored in a generated-voltage command storage unit, and that determines whether or not the power-generation amount suppression control is required, based on at least one of a past value and a present value of the generated-voltage command; therefore, there can be performed the best power-generation control without enlarging the apparatus, deteriorating the reliability, and raising the cost.

13 Claims, 10 Drawing Sheets

POWER-GENERATION CONTROL APPARATUS FOR IN-VEHICLE ELECTRIC ROTATING MACHINE

BACKGROUND OF THE INVENTION

1. Field of the Invention

The present invention relates to a power-generation control apparatus that controls power-generation operation of an in-vehicle electric rotating machine mounted in a vehicle.

2. Description of the Related Art

To date, an electric power generator that serves as an in-vehicle electric rotating machine mounted in a vehicle such as an automobile has been controlled by a voltage adjuster (regulator) in such a way that the generated voltage becomes constant regardless of the condition of the vehicle. However, in recent years, there has been employed a technology that variably controls a voltage to be generated by an electric power generator, in accordance with the traveling condition of a vehicle, the conditions of electric loads, the condition of a battery, or the like, in order to protect the environment, to improve the gasoline mileage, to raise the drivability, or the like. According to the foregoing technology, for example, the power-generation control is performed in such a way that, when a vehicle is accelerated, an in-bound power generation voltage command value for an electric power generator is set to a low value so that load torque for the engine is reduced, and when the vehicle is decelerated or when the accelerator pedal is released, the voltage to be generated is sharply raised so that the power generation is actively performed.

On the other hand, a widely spread gasoline engine is very powerless in a low rotation speed region and is characterized in that the torque responsiveness thereof is considerably low, compared to the responsiveness of the power-generation torque of the electric power generator mounted in the engine. Accordingly, in order to stabilize the rotation of the engine, there has been performed a so-called load-responsive control in which, even in the case where the electric load on the electric power generator drastically increases, the output of the electric power generator is raised not drastically but gradually.

Moreover, as an in-vehicle power generator control apparatus for controlling the output voltage of an in-vehicle power generator that charges a battery, there has been proposed a power-generation control apparatus (e.g., refer to Japanese Patent Application Laid-Open No. 2002-315221) in which there are included a duty ratio detection means that detects the duty ratio of a pulse signal as a command signal inputted from an external control apparatus, a load-responsive control means that suppresses increase in the magnetic-field current of the in-vehicle power generator, and a nullification control means that nullifies the operation of the load-responsive control means when a duty ratio detected by the duty ratio detection means falls within a predetermined range; by making the external control apparatus set the duty ratio of the pulse signal to a value within the predetermined range, it is determined whether or not the load-responsive control is required, and then by concurrently utilizing generated-voltage control and the load-responsive control in such a way that these controls compensate their shortcomings each other, the stabilization of the rotation of the engine and reduction of fuel costs are achieved.

A power-generation control apparatus, for an electric rotating machine, that performs suppression control of a power-generation amount through conventional load-responsive control operates even in a rapid power-generation period, such as a vehicle-speed deceleration period, during which electric power is actively generated; therefore, there has been a problem that a sufficient power-generation amount cannot be secured in a short-time rapid power-generation period. In the case of the conventional power-generation control apparatus disclosed in Japanese Patent Application Laid-Open No. 2002-315221, by regarding, as a rapid-charging required period, only the period during which the duty ratio as a present generated-voltage command is within the predetermined range, a power-generation amount suppression means is nullified. Accordingly, in a period during which the duty ratio is not within the predetermined range, the power-generation amount suppression means cannot be nullified; therefore, there has been a problem that fine control, of the power-generation amount, which complies with demands cannot be performed.

SUMMARY OF THE INVENTION

The present invention has been implemented in order to solve the foregoing problems of the conventional apparatus; the objective of the present invention is to obtain a power-generation control apparatus, for an electric rotating machine, that can perform the best power-generation control without enlarging the apparatus, deteriorating the reliability, and raising the cost.

A power-generation control apparatus for an in-vehicle electric rotating machine according to the present invention controls a power-generation amount of the in-vehicle electric rotating machine coupled with an internal combustion engine; the power-generation control apparatus is characterized by including a generated-voltage command unit that generates a generated-voltage command value for the in-vehicle electric rotating machine; a generated-voltage command storage unit that stores the generated-voltage command value generated by the generated-voltage command unit; and a power-generation amount suppression determination unit that determines whether or not to change a power-generation amount suppression level for suppressing the power-generation amount, based on at least one of a present generation-voltage command value generated by the generated-voltage command unit and a generated-voltage past command value based on a past generated-voltage command value stored in the generated-voltage command storage unit.

A power-generation control apparatus for an in-vehicle electric rotating machine according to the present invention controls a power-generation amount of the in-vehicle electric rotating machine coupled with an internal combustion engine; the power-generation control apparatus includes a generated-voltage command unit that generates a generated-voltage command value for the in-vehicle electric rotating machine; a generated-voltage command storage unit that stores the generated-voltage command value generated by the generated-voltage command unit; and a power-generation amount suppression determination unit that determines whether or not to change a power-generation amount suppression level for suppressing the power-generation amount, based on at least one of a present generation-voltage command value generated by the generated-voltage command unit and a generated-voltage past command value based on a past generated-voltage command value stored in the generated-voltage command storage unit. The power-generation control apparatus is characterized in that the power-generation amount suppression level is changed by altering a gradient for gradually increasing or gradually decreasing the power-generation amount.

Moreover, a power-generation control apparatus for an in-vehicle electric rotating machine according to the present invention controls a power-generation amount of the in-vehicle electric rotating machine coupled with an internal combustion engine; the power-generation control apparatus includes a generated-voltage command unit that generates a generated-voltage command value for the in-vehicle electric rotating machine; a generated-voltage command storage unit that stores the generated-voltage command value generated by the generated-voltage command unit; and a power-generation amount suppression determination unit that determines whether or not to change a power-generation amount suppression level for suppressing the power-generation amount, based on at least one of a present generation-voltage command value generated by the generated-voltage command unit and a generated-voltage past command value based on a past generated-voltage command value stored in the generated-voltage command storage unit. The power-generation control apparatus is characterized in that the power-generation amount suppression level is changed by altering an operation-start determination threshold value for gradually increasing or gradually decreasing the power-generation amount.

In the power-generation control apparatus for an in-vehicle electric rotating machine according to the present invention, the operation-start determination threshold value is preferably set based on a rotation speed of the internal combustion engine.

In the power-generation control apparatus for an in-vehicle electric rotating machine, the operation-start determination threshold value is preferably set based on a magnetic-field current value of the in-vehicle electric rotating machine.

In the power-generation control apparatus for an in-vehicle electric rotating machine according to the present invention, the operation-start determination threshold value is preferably set by changing a magnetic-field duty ratio for controlling the power-generation amount of the in-vehicle electric rotating machine.

Furthermore, in the power-generation control apparatus for an in-vehicle electric rotating machine according to the present invention, the power-generation amount suppression determination unit is preferably configured in such a way as to compare a predetermined value with a difference between a present generated-voltage command value generated by the generated-voltage command unit and a generated-voltage past command value based on a past generated-voltage command value stored in the generated-voltage command storage unit, and as to determine that the power-generation amount suppression level is to be changed, in the case where the difference has a predetermined relationship with the predetermined value.

Moreover, in the power-generation control apparatus for an in-vehicle electric rotating machine according to the present invention, the generated-voltage past command value is preferably formed of a moving average of plurality of past generated-voltage command values.

Still moreover, in the power-generation control apparatus for an in-vehicle electric rotating machine according to the present invention, the power-generation amount suppression determination unit is preferably characterized by comparing a predetermined value with a difference between a present generated-voltage command value generated by the generated-voltage command unit and a generated-voltage past command value based on a past generated-voltage command value stored in the generated-voltage command storage unit, and by determining that the power-generation amount suppression level is to be changed, in the case where the difference has a predetermined relationship with the predetermined value and the past generated-voltage command value is within a predetermined range.

Moreover, in the power-generation control apparatus for an in-vehicle electric rotating machine according to the present invention, the power-generation amount suppression determination unit is preferably configured in such a way as to compare a predetermined value with a difference between a present generated-voltage command value generated by the generated-voltage command unit and a generated-voltage past command value based on a past generated-voltage command value stored in the generated-voltage command storage unit, and as to determine that the power-generation amount suppression level is to be changed, in the case where the difference has a predetermined relationship with the predetermined value and the temperature of the in-vehicle electric rotating machine is within a predetermined range.

In a power-generation control apparatus for an in-vehicle electric rotating machine, according to the present invention, that controls a power-generation amount of the in-vehicle electric rotating machine coupled with an internal combustion engine, there are provided a generated-voltage command unit that generates a generated-voltage command value for the in-vehicle electric rotating machine; a generated-voltage command storage unit that stores the generated-voltage command value generated by the generated-voltage command unit; and a power-generation amount suppression determination unit that determines whether or not to change a power-generation amount suppression level for suppressing the power-generation amount, based on at least one of a present generation-voltage command value generated by the generated-voltage command unit and a generated-voltage past command value based on a past generated-voltage command value stored in the generated-voltage command storage unit; therefore, it is made possible to comprehend at least one of the past and the present transition of the power-generation state of a vehicle, whereby there can be performed the best power-generation control without enlarging the apparatus, deteriorating the reliability, and raising the cost.

Moreover, in a power-generation control apparatus for an in-vehicle electric rotating machine, according to the present invention, that controls a power-generation amount of the in-vehicle electric rotating machine coupled with an internal combustion engine, there are provided a generated-voltage command unit that generates a generated-voltage command value for the in-vehicle electric rotating machine; a generated-voltage command storage unit that stores the generated-voltage command value generated by the generated-voltage command unit; and a power-generation amount suppression determination unit that determines whether or not to change a power-generation amount suppression level for suppressing the power-generation amount, based on at least one of a present generation-voltage command value generated by the generated-voltage command unit and a generated-voltage past command value based on a past generated-voltage command value stored in the generated-voltage command storage unit; and the power-generation amount suppression level is changed by altering a gradient for gradually increasing or gradually decreasing the power-generation amount. Therefore, it is made possible to comprehend at least one of the past and the present transition of the power-generation state of a vehicle, whereby there can be performed the best power-generation control without enlarging the apparatus, deteriorating the reliability, and raising the cost.

Still moreover, in a power-generation control apparatus for an in-vehicle electric rotating machine, according to the present invention, that controls a power-generation amount of the in-vehicle electric rotating machine coupled with an internal combustion engine, there are provided a generated-voltage command unit that generates a generated-voltage command value for the in-vehicle electric rotating machine; a generated-voltage command storage unit that stores the generated-voltage command value generated by the generated-voltage command unit; and a power-generation amount suppression determination unit that determines whether or not to change a power-generation amount suppression level for suppressing the power-generation amount, based on at least one of a present generation-voltage command value generated by the generated-voltage command unit and a generated-voltage past command value based on a past generated-voltage command value stored in the generated-voltage command storage unit; and the power-generation amount suppression level is changed by altering an operation-start determination threshold value for gradually increasing or decreasing the power-generation amount. Therefore, it is made possible to comprehend at least one of the past and the present transition of the power-generation state of a vehicle, whereby there can be performed the best power-generation control without enlarging the apparatus, deteriorating the reliability, and raising the cost.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
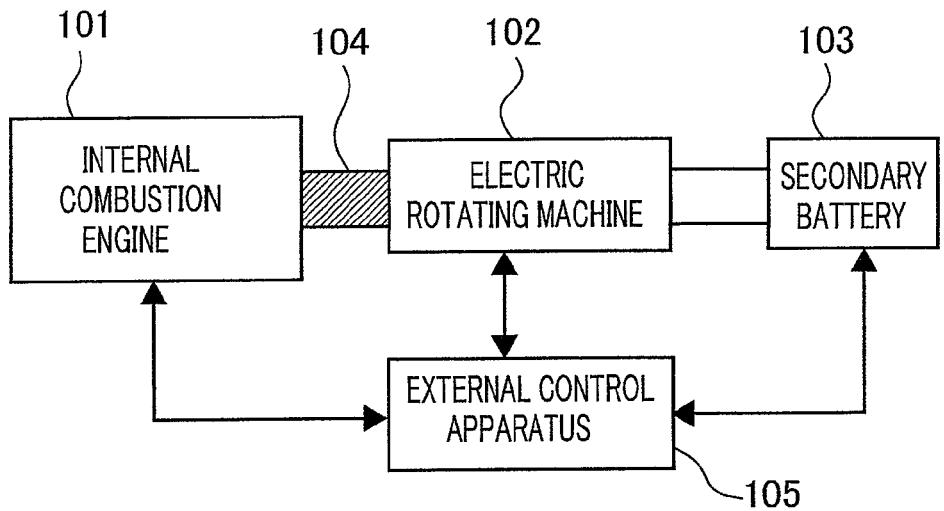
FIG. 1 is a block diagram illustrating the configuration of a vehicle equipped with a power-generation control apparatus, for an in-vehicle electric rotating machine, according to Embodiment 1 of the present invention.

FIG. 1 is a block diagram illustrating the configuration of a vehicle equipped with a power-generation control apparatus, for an in-vehicle electric rotating machine, according to Embodiment 1 of the present invention. In FIG. 1, an internal combustion engine (referred to as an engine, hereinafter) 101 such as a gasoline engine or a diesel engine and an in-vehicle electric rotating machine 102 equipped with a power-generation control apparatus according to Embodiment 1 of the present invention are combined with each other via a combining means 104 formed of a belt, a pulley, or the like, in such a way that the engine 101 and the in-vehicle electric rotating machine 102 can transfer torque to each other. The in-vehicle electric rotating machine 102 is electrically connected with a secondary battery 103; power-generation control is performed based on a target generated-voltage command signal that is fed from an external control apparatus 105 to the in-vehicle electric rotating machine 102. In addition, the engine 101 and the in-vehicle electric rotating machine 102 may directly be combined with each other without intermediary of the combining means 104.

Figure 2:
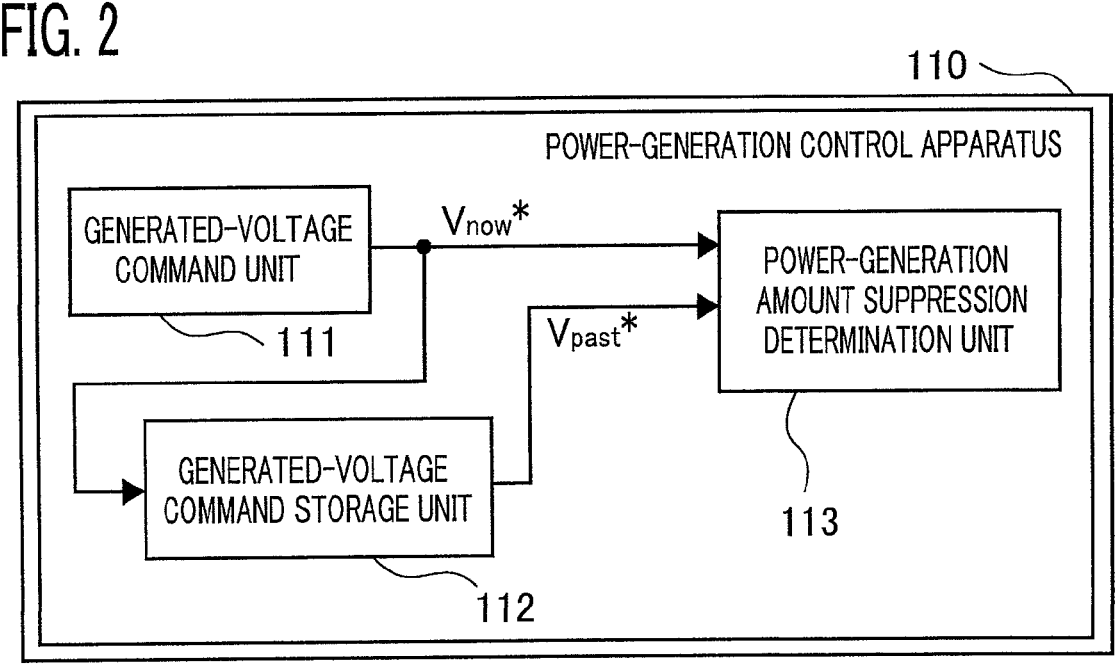
FIG. 2 is a block diagram illustrating the configuration of a power-generation control apparatus, for an in-vehicle electric rotating machine, according to Embodiment 1 of the present invention.

FIG. 2 is a block diagram illustrating the configuration of a power-generation control apparatus, for an in-vehicle electric rotating machine, according to Embodiment 1 of the present invention. In FIG. 2, a power-generation control apparatus 110 is provided with a generated-voltage command unit 111, a generated-voltage command storage unit 112, and a power-generation amount suppression determination unit 113.

The power-generation control apparatus 110 mounted in the in-vehicle electric rotating machine 102 is electrically connected with the external control apparatus 105 by means of a signal line; the power-generation control apparatus 110 detects the duty ratio of a pulse signal that forms the target generated-voltage command signal fed from the external control apparatus 105 via the signal line, converts the detected duty ratio into a generated-voltage command value, which is approximately in proportion to the duty ratio, and outputs the generated-voltage command value.

Figure 3:
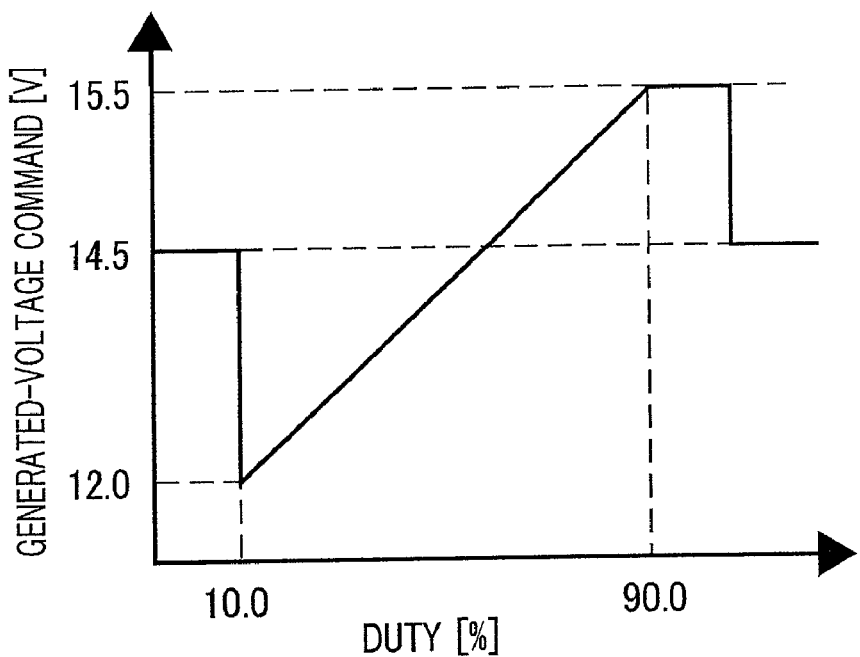
FIG. 3 is a characteristic graph representing the relationship between the duty ratio as a command signal and the generated-voltage command value that are given to a power-generation control apparatus, for an in-vehicle electric rotating machine, according to Embodiment 1 of the present invention.

FIG. 3 is a characteristic graph representing the relationship between the duty ratio as a command signal and the generated-voltage command value that are given to a power-generation control apparatus, for an in-vehicle electric rotating machine, according to Embodiment 1 of the present invention.

As represented in FIG. 3, in the range where the duty ratio of the target generated-voltage command signal fed from the external control apparatus 105 varies from 10% to 90%, the generated-voltage command value, which is linearly proportional to the duty ratio, varies from 12.0 V to 15.5 V. In the range where the duty ratio varies from 0% to 10%, the generated-voltage command value is a constant value of 14.5 V; in the range where the duty ratio is larger than 90%, the generated-voltage command value becomes a constant value of 15.5 V. In addition, a serial communication means typified by a LIN (Local Interconnect Network) or a BSS (Bit Synchronous Signal) and a target generated-voltage command signal generated by switching on/off a signal may be utilized.

Because the generated-voltage command unit 111 generates the generated-voltage command value, based on a command signal from the external control apparatus 105 that recognizes the condition of the secondary battery or the driving condition of the vehicle, there can be generated a generated-voltage command value that is optimum to the vehicle as a whole.

When a generated-voltage command value based on the target generated-voltage command signal is given by the external control apparatus 105, the generated-voltage command unit 111 generates, based on the generated-voltage command value, a present generated-voltage command value (referred to as a generated-voltage present command value, hereinafter) Vnow* for a voltage to be generated by the in-vehicle electric rotating machine 102. The generated-voltage command storage unit 112 sequentially stores the generated-voltage present command values Vnow* generated by the generated-voltage command unit 111. The generated-voltage present command value Vnow* outputted from the generated-voltage command unit 111 and a past generated-voltage command value (referred to as a generated-voltage past command value, hereinafter) Vpast* stored in the generated-voltage command storage unit 112 are inputted to the power-generation amount suppression determination unit 113; based on the inputted generated-voltage present command value Vnow* and the inputted generated-voltage past command value Vpast*, the power-generation amount suppression determination unit 113 performs determination as to whether or not to change a power-generation amount suppression level, in such a way as described later.

The generated-voltage past command value Vpast* outputted from the generated-voltage command storage unit 112 is a generated-voltage command value N times prior to the generated-voltage present command value Vnow* outputted from the generated-voltage command unit 111. Accordingly, even in the case where the generated-voltage present command value Vnow* periodically changes, determination as to whether or not to implement the power-generation amount suppression control can correctly be performed.

Figure 4:
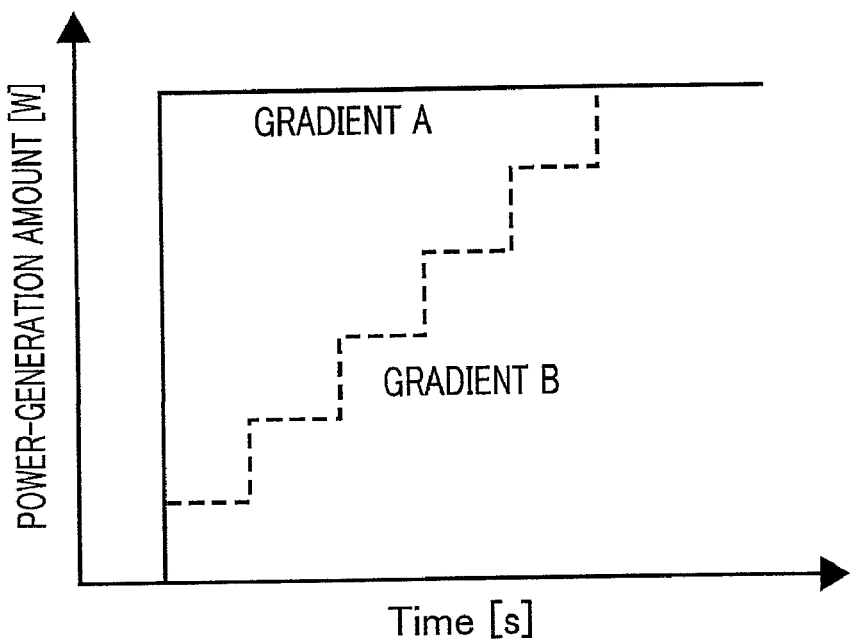
FIG. 4 is an explanatory graph representing an example of setting of a gradient for gradually increasing a power-generation amount or gradually decreasing a power-generation amount in a power-generation control apparatus, for an in-vehicle electric rotating machine, according to Embodiment 1 of the present invention.

FIG. 4 is an explanatory graph representing an example of setting of a gradient for gradually increasing a power-generation amount or gradually decreasing a power-generation amount in a power-generation control apparatus, for an in-vehicle electric rotating machine, according to Embodiment 1 of the present invention. In FIG. 4, the gradient A represents the characteristic of a rapid charging state in which the power-generation amount [W] is raised from "0" to a predetermined value in an approximately perpendicular manner. The gradient B, which is a default gradient, represents the characteristic of a normal power-generation state in which the power-generation amount [W] is raised step by step from "0" to the predetermined value in a predetermined time period.

Figure 5:
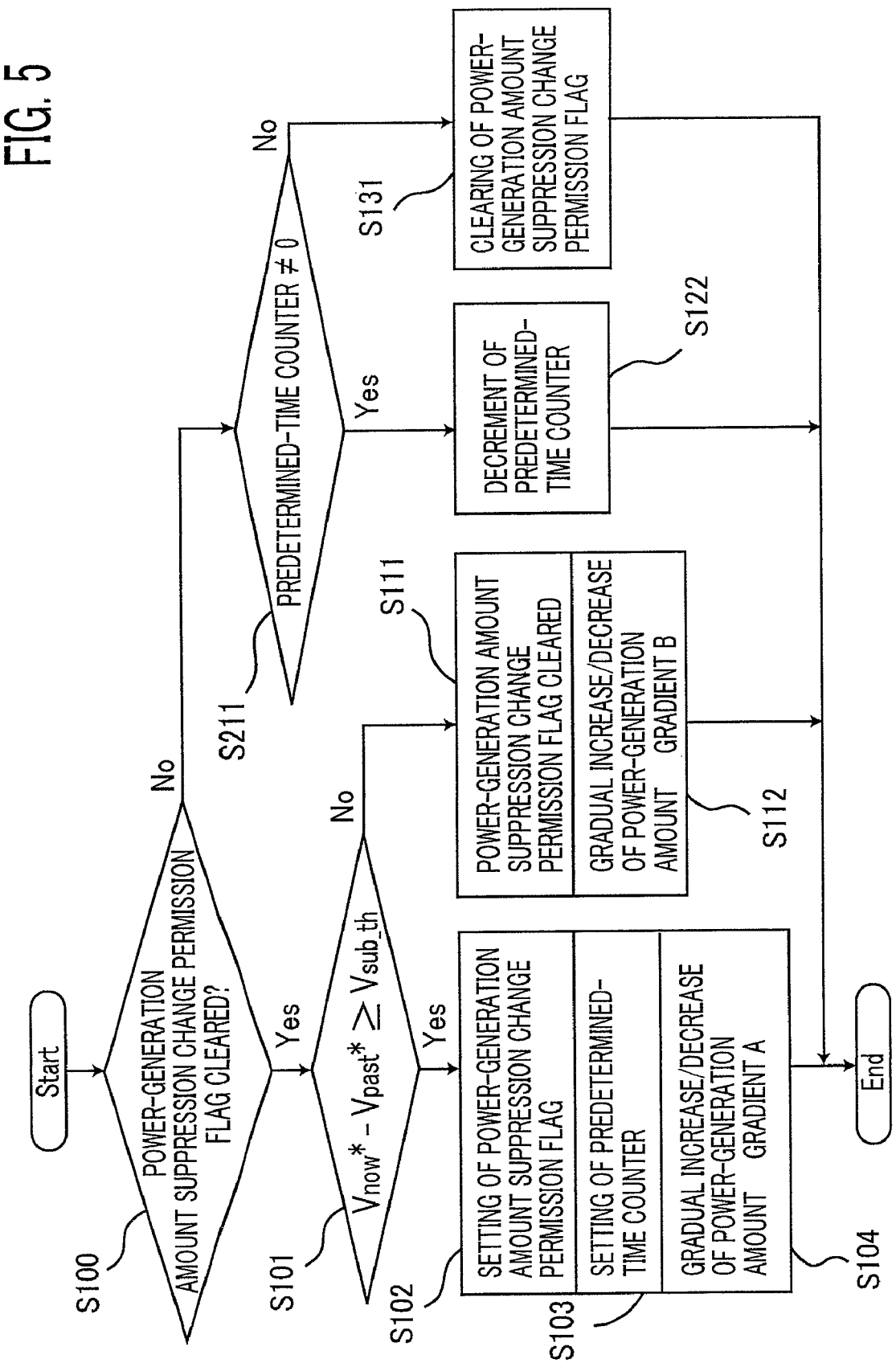
FIG. 5 is a flowchart representing the operation of a power-generation amount suppression determination unit in a power-generation control apparatus, for an in-vehicle electric rotating machine, according to Embodiment 1 of the present invention.

FIG. 5 is a flowchart representing the operation of the power-generation amount suppression determination unit 113 in a power-generation control apparatus, for an in-vehicle electric rotating machine, according to Embodiment 1 of the present invention. The processing represented in FIG. 5 is repeated every predetermined time period. In FIG. 5, at the initial time instant, the foregoing gradient B has been set in the power-generation control apparatus 110 in a default manner. At first, in the step S100, it is determined whether or not the power-generation amount suppression level has been changed, i.e., whether or not a power-generation amount suppression change permission flag has been cleared. In the case where, after the determination in the step S100, it is determined that power-generation amount suppression change permission flag has been cleared, it is suggested that the power-generation amount suppression change has not been permitted; accordingly, at this time instant, the gradient for gradually increasing a power-generation amount or gradually decreasing a power-generation amount is the gradient B that has been set in a default manner, i.e., the power generation is in the normal power-generation state.

In the case where, after the determination in the step S100, it is determined that power-generation amount suppression change permission flag has been cleared, the outcome of the determination becomes "Yes" and the step S100 is followed by the step S101, where it is determined whether or not the difference between the generated-voltage present command value Vnow* generated by the generated-voltage command unit 111 and the N-times-prior generated-voltage past command value Vpast* stored in the generated-voltage command storage unit 112 is the same as or larger than a predetermined value Vsub # th.

In addition, with regard to the generated-voltage past command value Vpast* outputted from the generated-voltage command storage unit 112, the N-times-prior generated-voltage past command value may be replaced by a moving-average value of latest generated-voltage past command values accumulated a predetermined times or by a moving-average value of all accumulated generated-voltage past command values. In this case, by making a moving average, an erroneous determination based on an immediately previous power-generation command error caused by noise or the like is eliminated so that a stable power-generation amount suppression determination can be performed; therefore, it is made possible to reinforce the power-generation amount suppression determination against disturbance.

In the case where, in the step S101, it is determined that the difference between the generated-voltage present command value Vnow* and the generated-voltage past command value Vpast* is the same as or larger than the predetermined value Vsub # th, the outcome of the determination becomes "Yes" and the step S101 is followed by the step S102, where there is set the power-generation amount suppression change permission flag for changing the power-generation amount suppression level. After that, in the step S103, a decrement counter, which is a predetermined-time counter for performing power-generation amount suppression operation only for a predetermined time, is set to a predetermined value; then, in the step S104, there is selected the gradient A for gradually increasing a power-generation amount or gradually decreasing a power-generation amount, and then the processing in the power-generation amount suppression determination unit 113 is ended. As a result, the state of the in-vehicle electric rotating machine 102 is changed from the normal power-generation state in which the power-generation amount suppression operation is performed to the rapid charging state in which the power-generation amount suppression is prohibited.

As described above, in the case where the difference between the generated-voltage present command value Vnow* and the generated-voltage past command value Vpast* is the same as or larger than the predetermined value Vsub # th, the power-generation control apparatus 110 performs in accordance with the gradient A power-generation amount non-suppression control in which the power-generation amount suppression is prohibited.

In contrast, in the case where, in the step S101, it is determined that the difference between the generated-voltage present command value Vnow* and the generated-voltage past command value Vpast* is smaller than the predetermined value Vsub # th, the outcome of the determination becomes "No", and the step S101 is followed by the step S111. In the step S111, the power-generation amount suppression change permission flag is kept cleared; therefore, the gradient for gradually increasing a power-generation amount or gradually decreasing a power-generation amount is kept to be the default gradient B.

As described above, in the case where the difference between the generated-voltage present command value Vnow* and the generated-voltage past command value Vpast* is smaller than the predetermined value Vsub # th, the power-generation control apparatus 110 performs power-generation amount suppression operation in accordance with the gradient B.

Next, there will be explained processing performed in the case where the determination in the step S100 is "No", i.e., in the case where the power-generation amount suppression change permission flag has not been cleared and hence rapid charging is being performed in accordance with the gradient A. In this case, the step S100 is followed by the step S121, where it is determined whether or not the power-generation amount suppression level has been being changed for more than a predetermined time; in the case where it is determined that the power-generation amount suppression level has been being changed for more than the predetermined time, i.e., in the case where it is determined that the value of the decrement counter has been decreased from the predetermined value to "0", the step S121 is followed by the step S131, where the power-generation amount suppression change permission flag is cleared. As a result, the gradient returns from A to B, i.e., the rapid power-generation state is replaced by the normal power-generation state. In contrast, in the case where, in the step S121, it is determined that the value of the decrement counter in not "0", the step S121 is followed by the step S122, where the value of the decrement counter is reduced.

The reason why, as described above, the rapid power-generation state according to the gradient A is maintained only for a predetermined time is that, after the rapid charging state, the power-generation control apparatus 110 not only maintains the normal power-generation state, i.e., performs the load-responsive control so as to contribute to the stability of the engine, but also usefully functions as a fail-safe that does not prohibit the load-responsive control for more than a predetermined time.

In Embodiment 1, as the predetermined-time counter, a decrement counter is utilized; however, it goes without saying that an increment counter may be utilized. In that case, when the value of the predetermined-time counter has reached a predetermined value, the result of the determination in the step S121 becomes "Yes", and hence the power-generation amount suppression change permission flag is cleared in the step S131; in the case where the value of the predetermined-time counter has not reached the predetermined value, the result of the determination in the step S121 becomes "No", and hence the value of the predetermined-time counter is increased in the step S122.

Next, there will be explained the operation of the power-generation amount suppression determination unit 113 according to Embodiment 1 of the present invention, by use of specific examples of numerical values. Here, there is assumed a case in which the predetermined value Vsub # th, which is compared with the difference between the generated-voltage present command value Vnow* and the N-times-prior generated-voltage past command value Vpast*, is set to 0.6 V, and the normal power-generation state is replaced by the rapid charging state. In this situation, provided the external control apparatus 105 generates the generated-voltage command value as a command signal for replacing the normal power-generation state by the rapid charging state, the generated-voltage command unit 111 in the power-generation control apparatus 110 outputs based on the generated-voltage command value, for example, 15.0 V as the generated-voltage present command value Vnow* for replacing the normal power-generation state by the rapid charging state.

In the determination performed by the power-generation amount suppression determination unit 113, when it is assumed that the generated-voltage past command value Vpast*, for the N-times-prior normal power-generation state, that is outputted from the generated-voltage command storage unit 112 is 14.4 V, the difference (15.0 V−14.4V=0.6 V) between the generated-voltage present command value Vnow* and the generated-voltage past command value Vpast* becomes equal to the predetermined value Vsub # th (0.6V), and hence (Vnow*−Vpast*)≧Vsub # th is satisfied; therefore, there is selected the foregoing gradient A for rapidly raising the generated voltage so as to cause the rapid charging state.

In contrast, there is assumed a case in which, during the normal power-generation state, the generated voltage is changed. When it is assumed that the external control apparatus 105 outputs a command signal for replacing the generated-voltage past command value Vpast* (14.4V) in the normal power-generation state by the generated-voltage present command value Vnow* (14.6 V), the equation (Vnow*−Vpast*<Vsub # th) is satisfied; therefore, the result of the determination in the step S101 performed by the power-generation amount suppression determination unit 113 becomes "No". Accordingly, the power-generation amount suppression level is not changed, and the normal power generation is performed in accordance with the gradient B, which is a default gradient. In addition, the foregoing process is established under the condition that, after it is determined in the step S100 that the power-generation amount suppression change permission flag has been cleared, the step S100 has been followed by the step S101.

In addition, it has been explained that, in the step S101, it is determined whether or not the difference between the generated-voltage present command value Vnow* and the generated-voltage past command value Vpast* is the same as or larger than the predetermined value Vsub # th; however, the determination condition is not limited thereto, and it may be determined whether or not the difference between the generated-voltage present command value Vnow* and the generated-voltage past command value Vpast* is larger than the predetermined value Vsub # th.

Moreover, in the determination in the step S101, it may be determined whether or not the difference between the generated-voltage present command value Vnow* and the generated-voltage past command value Vpast* is the same as or smaller than the predetermined value Vsub#th, or it may be determined whether or not the difference between the generated-voltage present command value Vnow* and the generated-voltage past command value Vpast* is smaller than the predetermined value Vsub # th. In this case, the result "Yes" of the determination in the step S101 in FIG. 5 may be replaced by "No", and vice versa.

Next, the power-generation amount suppression operation for suppressing the power generation amount will be explained. Letting Nmg and Φ denote the rotation speed of an in-vehicle electric rotating machine and the main magnetic flux, respectively, an induction voltage E generated by the in-vehicle electric rotating machine 102 is given by the equation (1).

$$E = K1 \times Nmg \times \Phi \quad (1)$$

where K1 is a coefficient.

In the case where the in-vehicle electric rotating machine 102 is a coil-magnetic-field electric rotating machine, a magnetic-field current If is approximately proportional to the main magnetic flux Φ of an in-vehicle electric rotating machine; thus, the equation (1) is rewritten as follows:

$$E = K2 \times Nmg \times If \quad (2)$$

where K2 is a coefficient.

When the induction voltage E of the in-vehicle electric rotating machine 102 exceeds the battery voltage, it is made possible to make the in-vehicle electric rotating machine 102 operate as an electric power generator; a common and simple method of controlling the power-generation amount is to increase or decrease a factor related to the induction voltage E represented in the foregoing equation (1) or (2). For example, in the case where the in-vehicle electric rotating machine 102 is a coil-magnetic-field electric rotating machine, the power-generation amount can be controlled by increasing or decreasing the value of the magnetic-field current If, or by increasing or decreasing the duty ratio of a PWM (Pulse Width Modulation) for controlling the magnetic-field current If. Accordingly, in the power-generation control apparatus, for an in-vehicle electric rotating machine, according to Embodiment 1 of the present invention, the power-generation amount suppression operation is performed by increasing or decreasing the factors described in the equation (1) or (2), as described above. In addition, changing the gradient of the power-generation amount means changing the increase/decrease level per time of the main magnetic flux Φ in the equation (1); for example, in the case where the in-vehicle electric rotating machine 102 is a coil-magnetic-field electric rotating machine, as can be seen from the equation (2), changing the gradient of the power-generation amount is equivalent to changing the increase/decrease level per time of the value of the magnetic-field current, the duty ratio of a PWM for controlling the magnetic-field current, or the like.

As described above, in the power-generation control apparatus, for an in-vehicle electric rotating machine, according to Embodiment 1 of the present invention, it is determined whether or not the power-generation amount suppression control is required, based on both the past value and the present value of the generated-voltage command; therefore, it is made possible to comprehend the transition from the past to the present of the power-generation state of a vehicle, whereby the best power-generation control can be performed.

In the case where the present generated-voltage command largely changes from the past generated-voltage command, by changing the power-generation amount suppression level, the generated voltage is rapidly raised to perform rapid charging, so that more power-generation amount can be ensured in a limited time period such as a time during which a vehicle speed is decelerated.

Moreover, in the case where the present generated-voltage command slightly changes from the past generated-voltage command, the power-generation amount suppression level becomes a normal level, i.e., a default level; therefore, the normal power-generation characteristics can be realized.

Embodiment 2

The differences between the operation of a power-generation amount suppression determination unit of a power-generation control apparatus for an in-vehicle electric rotating machine according to Embodiment 2 and the operation of the power-generation amount suppression determination unit according to Embodiment 1 described above are the determination condition for changing the power-generation amount suppression level and the method of changing the power-generation amount suppression level. The configuration of a vehicle equipped with a power-generation control apparatus for an in-vehicle electric rotating machine according to Embodiment 2 of the present invention and the configuration of the power-generation control apparatus for an in-vehicle electric rotating machine are the same as those illustrated in FIGS. 1 and 2, respectively, in Embodiment 1.

Figure 6:
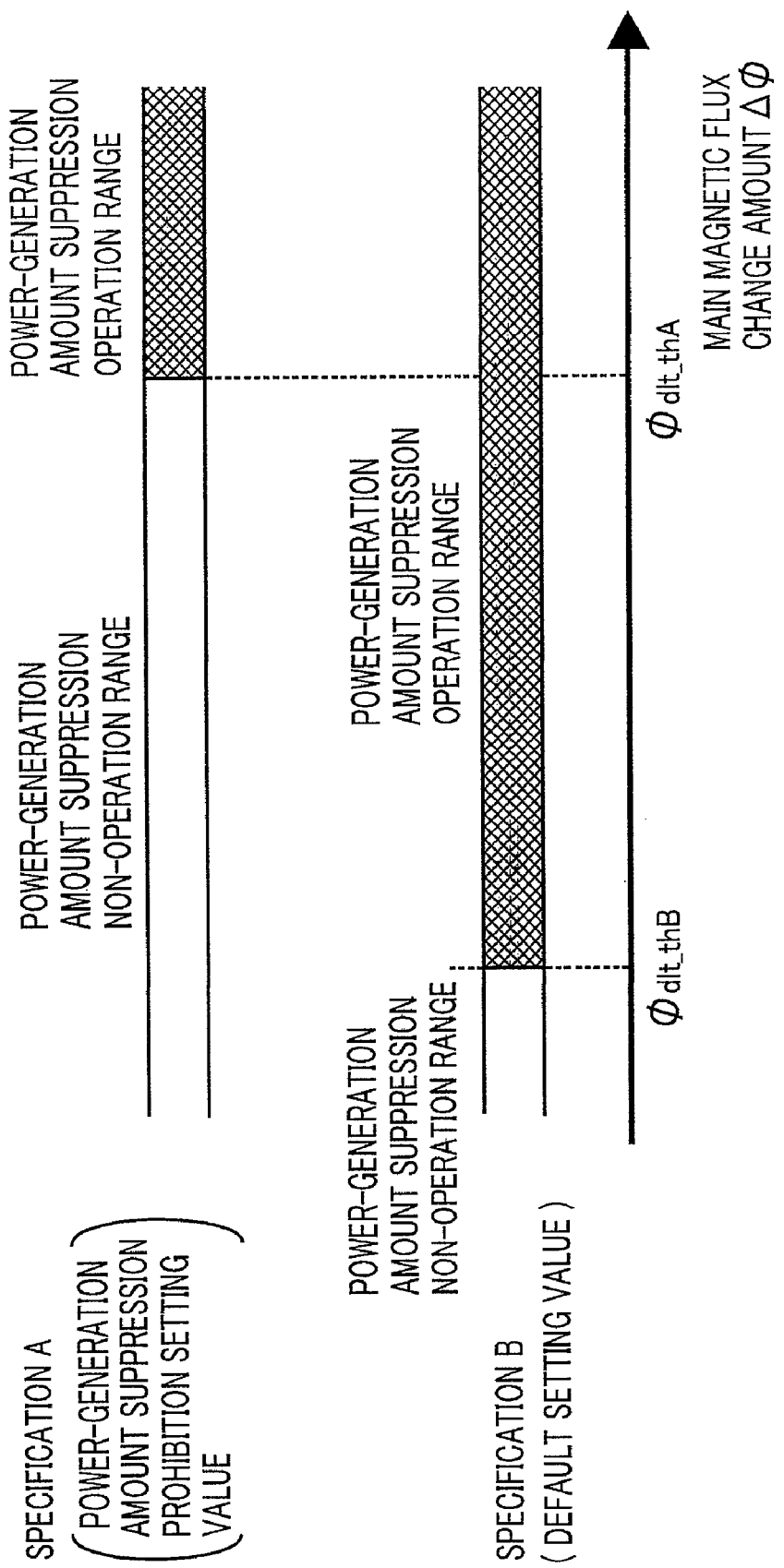
FIG. 6 is an explanatory chart representing an example of setting of an operation-start determination threshold value for gradually increasing a power-generation amount or gradually decreasing a power-generation amount in a power-generation control apparatus, for an in-vehicle electric rotating machine, according to Embodiment 2 of the present invention.

Firstly, there will be explained a power-generation amount suppression operation start threshold value for starting the power-generation amount suppression operation in a power-generation control apparatus for an in-vehicle electric rotating machine according to Embodiment 2 of the present invention. FIG. 6 is an explanatory chart representing an example of setting of a power-generation amount suppression operation start threshold value in a power-generation control apparatus, for an electric rotating machine according to Embodiment 2 of the present invention. The power-generation amount suppression operation start determination threshold value represented in FIG. 6 is determined based on a main-magnetic-flux change amount between the past and present values of the main magnetic flux of the in-vehicle electric rotating machine 102; the power-generation amount suppression operation start threshold value is set in such a way that the power-generation amount suppression control is performed in the case where the main magnetic flux change amount Δϕ exceeds a predetermined value.

In the specification A represented in FIG. 6, a power-generation amount suppression operation start determination threshold value ϕdlt # thA is set for a relatively large main magnetic flux change amount Δϕ; in the specification B, a default setting value is utilized, and the power-generation amount suppression operation start determination threshold value ϕdlt # thB is set to a value that is extremely smaller than the power-generation amount suppression operation start determination threshold value ϕdlt # thA (ϕdlt # thA>>ϕdlt # thB) according to the specification A.

In FIG. 6, in the specification A, when the main magnetic flux change amount Δϕ exceeds the power-generation amount suppression operation start determination threshold value ϕdlt # thA, the power-generation amount suppression operation is started, so that the power-generation control apparatus comes into the power-generation amount suppression operation range; until the main magnetic flux change amount Δϕ exceeds the power-generation amount suppression operation start determination threshold value ϕdlt # thA, the power-generation control apparatus is in the power-generation amount suppression non-operation range in which the power-generation amount suppression operation is prohibited. In contrast, in the default specification B, normal power-generation amount suppression operation is performed; when the main magnetic flux change amount Δφ exceeds the power-generation amount suppression operation start determination threshold value φdlt # thB, the power-generation amount suppression operation is started, so that the power-generation control apparatus comes into the power-generation amount suppression operation range; until the main magnetic flux change amount Δφ exceeds the power-generation amount suppression operation start threshold value φdlt # thB, the power-generation control apparatus is in the power-generation amount suppression non-operation range in which the power-generation amount suppression operation is prohibited. As described above, by setting a threshold value, there can be created, in the specification A, the rapid charging state in which the power-generation amount suppression operation is not performed until the main magnetic flux becomes relatively large.

Figure 7:
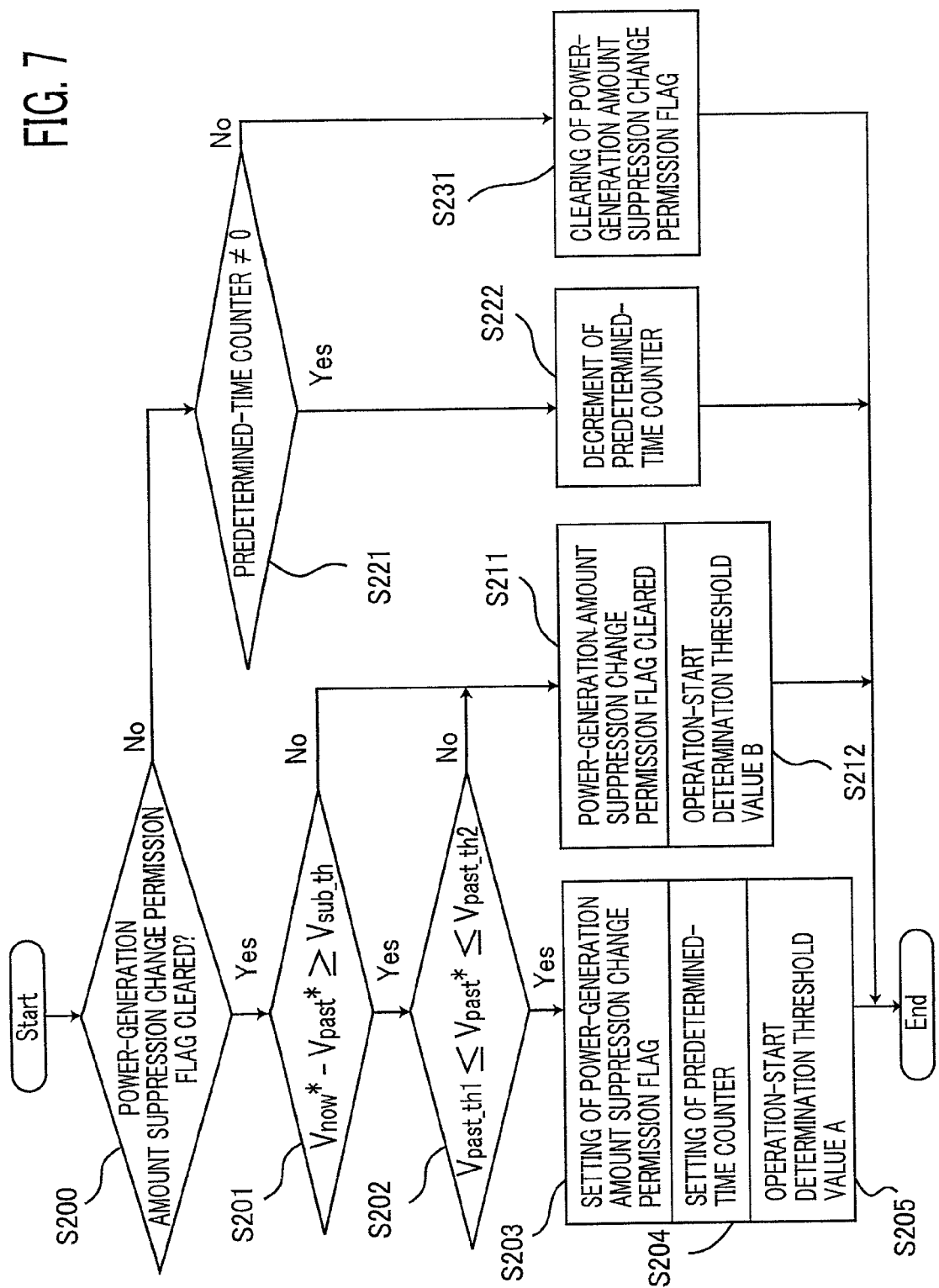
FIG. 7 is a flowchart representing the operation of a power-generation amount suppression determination unit in a power-generation control apparatus, for an in-vehicle electric rotating machine, according to Embodiment 2 of the present invention.

FIG. 7 is a flowchart representing the operation of the power-generation amount suppression determination unit in a power-generation control apparatus, for an in-vehicle electric rotating machine, according to Embodiment 2 of the present invention. The differences between the flowchart in FIG. 7 according to Embodiment 2 and the flowchart in FIG. 5 according to Embodiment 1 described above are the determination condition for changing the power-generation amount suppression level and the method of changing the power-generation amount suppression level. The configuration of a vehicle equipped with a power-generation control apparatus for an in-vehicle electric rotating machine according to Embodiment 2 of the present invention and the configuration of the power-generation control apparatus for an in-vehicle electric rotating machine are the same as those illustrated in FIGS. 1 and 2, respectively, in Embodiment 1.

In FIG. 7, at the initial time instant, the foregoing default specification B has been set in the power-generation control apparatus 110. In the step S200, it is determined whether or not the power-generation amount suppression level has been changed; in the case where the power-generation amount suppression level has not been changed, i.e., in the case where it is determined that the power-generation amount suppression change permission flag has been cleared, it is suggested that the power-generation amount suppression change has not been permitted; therefore, at this time instant, the power-generation amount suppression operation start threshold value has been set to the default specification B.

In the case where the outcome of the determination performed in the step S200 becomes "Yes", the step S200 is followed by the step S201. In the step S201, it is determined whether or not the difference between the generated-voltage present command value Vnow* generated by the generated-voltage command unit 111 and the N-times-prior generated-voltage past command value Vpast* stored in the generated-voltage command storage unit 112 is the same as or larger than the predetermined value Vsub # th.

In addition, with regard to the generated-voltage past command value Vpast* outputted from the generated-voltage command storage unit 112, the N-times-prior generated-voltage past command value may be replaced by a moving-average value of latest generated-voltage past command values accumulated a predetermined times or by a moving-average value of all accumulated generated-voltage past command values. In this case, by making a moving average, an erroneous determination based on an immediately previous power-generation command error caused by noise or the like is eliminated so that a stable power-generation amount suppression determination can be performed; therefore, it is made possible to reinforce the power-generation amount suppression determination against disturbance.

In the case where, in the step S201, it is determined that the difference between the generated-voltage present command value Vnow* and the generated-voltage past command value Vpast* is the same as or larger than the predetermined value Vsub # th, the outcome of the determination becomes "Yes", and the step S201 is followed by the step S202.

In the step S202, it is determined whether or not the generated-voltage past command value Vpast* is within a range from a first setting threshold value Vpast # th1 to a second setting threshold value Vpast # th2 (Vpast # th1≦Vpast*≦Vpast # th2). In the case where the outcome of the determination performed in the step S202 becomes "Yes", the step S202 is followed by the step S203, where there is set the power-generation amount suppression change permission flag for changing the power-generation amount suppression level.

Next, in the step S204, the value of a decrement counter, which is a predetermined-time counter for changing the power-generation amount suppression level only for a predetermined time, is set to a predetermined value; after that, in the step S205, a constant, which is the operation-start determination threshold value for starting the power-generation amount suppression operation, is changed to the foregoing specification A, and then the processing in the power-generation amount suppression determination unit 113 is ended. As a result, the state of the in-vehicle electric rotating machine 102 is changed from the normal power-generation state in which the power-generation amount suppression operation is performed to the rapid charging state in which the power-generation amount suppression is prohibited.

As described above, in the case where the difference between the generated-voltage present command value Vnow* and the generated-voltage past command value Vpast* is the same as or larger than the predetermined value Vsub # th and the generated-voltage past command value Vpast* is within the range from the first setting threshold value Vpast # th1 to the second setting threshold value Vpast # th2 (Vpast # th1≦Vpast*≦Vpast # th2), the power-generation control apparatus 110 comes into the power-generation amount suppression non-operation state in which, based on the specification A, the power-generation amount suppression is prohibited.

In FIG. 7, in the case where, in the step S201, it is determined that the difference between the generated-voltage present command value Vnow* and the generated-voltage past command value Vpast* is smaller than the predetermined value Vsub # th, the outcome of the determination becomes "No", and the step S201 is followed by the step S211. In the case where, after the step S201 is followed by the step S202, it is determined that the generated-voltage past command value Vpast* is not within the range from the first setting threshold value Vpast # th1 to the second setting threshold value Vpast # th2 (Vpast # th1≦Vpast*≦Vpast # th2), the outcome of the determination becomes "No", and the step S202 is also followed by the step S211.

In the step S211, the power-generation amount suppression change permission flag is kept cleared, and in the step S212, the operation-start determination threshold value is set to the default specification B, so that the power-generation control apparatus comes into the normal power-generation control state.

Next, in FIG. 7, there will be explained processing in the case where the power-generation amount suppression level has been changed, i.e., in the case where the rapid charging is being performed in accordance with the specification A and the determination in the step S200 is "No". In this case, the step S200 is followed by the step S221, where it is determined whether or not the power-generation amount suppression level has been being changed for more than a predetermined time; in the case where it is determined that the power-generation amount suppression level has been being changed for more than the predetermined time, i.e., in the case where it is determined that the value of the decrement counter has been decreased from the predetermined value to "0", the step S221 is followed by the step S231, where the power-generation amount suppression change permission flag is cleared. As a result, the operation-start determination threshold value returns from the specification A for the rapid power generation to the default specification B, and the power-generation control apparatus comes into the normal power-generation control state. In contrast, in the case where, in the step S221, it is determined that the value of the decrement counter in not "0", the step S221 is followed by the step S222, where the value of the decrement counter is reduced.

The reason why, as described above, the rapid power-generation state according to the gradient A is maintained only for a predetermined time is that, after the rapid charging state, the power-generation control apparatus 110 not only maintains the normal power-generation state, i.e., performs the load-responsive control so as to contribute to the stability of the engine, but also usefully functions as a fail-safe that does not prohibit the load-responsive control for more than a predetermined time.

In Embodiment 2, as the predetermined-time counter, a decrement counter is utilized; however, it goes without saying that an increment counter may be utilized. In that case, when the value of the predetermined-time counter has reached a predetermined value, the result of the determination in the step S221 becomes "Yes", and hence the power-generation amount suppression change permission flag is cleared in the step S231; in the case where the value of the predetermined-time counter has not reached the predetermined value, the result of the determination in the step S221 becomes "No", and hence the value of the predetermined-time counter is increased in the step S222.

Next, there will be explained the operation of the power-generation amount suppression determination unit 113 according to Embodiment 2 of the present invention, by use of specific examples of numerical values. Here, the predetermined value Vsub # th to be compared with the difference between the generated-voltage present command value Vnow* and the generated-voltage past command value Vpast* is set to 1.0 V; the first setting threshold value Vpast # th1 is set to 13.0 V, and the second setting threshold value Vpast # th2 is set to 14.0 V; and there will be assumed a transition from the power-generation interruption state to the normal power-generation state, such as a transition from the engine start state or the acceleration state to the constant-speed state. In the transition state, it is preferable to perform the power-generation amount suppression operation as usual.

Here, it is assumed that external control apparatus 105 outputs a command signal for the transition from the power-generation interruption state to the normal power-generation state, and that there is performed a generated-voltage change for changing the state of the power-generation control apparatus from the power-generation interruption state where the generated-voltage past command value Vpast* is 12.0 V to the normal power-generation state where the generated-voltage present command value Vnow* is 14.4 V. Because the equation (Vnow*−Vpast*≧Vsub # th) is satisfied, the outcome of the determination in the step S201 in FIG. 7 becomes "Yes", and hence the step S201 is followed by the step S202; however, because the equation (Vpast # th1≦Vpast*≦Vpast # th2) is not satisfied, the outcome of the determination in the step S202 becomes "No", and hence the step 202 is followed by the step S211; then, the step S211 is followed by the step S212.

Accordingly, in this case, the power-generation amount suppression change is not performed, and there is selected the power-generation amount suppression operation start determination threshold value φdlt # thB according to the default specification B in FIG. 6. As a result, because the power-generation amount suppression is securely performed, a comfortable and high-reliability in-vehicle electric rotating machine can be provided.

Next, a transition from the charge-discharge balanced state to the rapid charging state will be assumed. In this transition state, in order to securely perform the rapid charging, it is preferable to prohibit the power-generation amount suppression operation so as to make the power-generation control apparatus come into the power-generation amount suppression non-operation state. Here, it is assumed that external control apparatus 105 outputs a command signal for the transition from the charge-discharge balanced state to the rapid charging state, and that there is performed a generated-voltage change for changing the state of the power-generation control apparatus from the charge-discharge balanced state where the generated-voltage past command value Vpast* is 13.5 V to the rapid charging state where the generated-voltage present command value Vnow* is 15.0 V. Because both the equation (Vnow*−Vpast*≧Vsub # th) and the equation (Vpast # th1≦Vpast*≦Vpast # th2) are satisfied, the step S202 is followed by the step S203 in FIG. 7; after that, the step S203 is followed by the step S204, and then the step S204 is followed by the step S205.

Accordingly, the specification B represented in FIG. 6 is replaced by the specification A so that the power-generation amount suppression operation start determination threshold value φdlt # thA is selected. As a result, until the main magnetic flux change amount Δφ exceeds the power-generation amount suppression operation start determination threshold value φdlt # thA, the power-generation amount suppression operation is prohibited; thus, short-time rapid charging is also securely performed.

Furthermore, a transition from the charge-discharge balanced state to the normal power-generation state will be assumed. In this transition state, it is preferable to perform the power-generation amount suppression operation as usual. Here, it is assumed that external control apparatus 105 outputs a command signal for the transition from the charge-discharge balanced state to the normal power-generation state, and that there is performed a generated-voltage change for changing the state of the power-generation control apparatus from the charge-discharge balanced state where the generated-voltage past command value Vpast* is 13.5 V to the normal power-generation state where the generated-voltage present command value Vnow* is 14.4 V. Because the equation (Vnow*−Vpast*≧Vsub # th) is not satisfied, the outcome of the determination in the step S201 in FIG. 7 becomes "No".

Accordingly, the step S201 is followed by the step S211, and then by the step S212; the power-generation amount suppression level is not changed, and the default specification B is set. In addition, in this case, although the equation (Vpast # th1≦Vpast*≦Vpast # th2) is satisfied, the step S201 is not followed by the step S202, as described above; therefore, the determination in the step S202 is not performed. As a result, as is the case with a vehicle in which conventional power-generation amount suppression operation is performed, a comfortable and high-reliability in-vehicle electric rotating machine can be provided.

In addition, it has been explained that, in the step S201, it is determined whether or not the difference between the generated-voltage present command value Vnow* and the generated-voltage past command value Vpast* is the same as or larger than the predetermined value Vsub # th; however, the determination condition is not limited thereto, and it may be determined whether or not the difference between the generated-voltage present command value Vnow* and the generated-voltage past command value Vpast* is larger than the predetermined value Vsub # th.

Moreover, it may be determined whether or not the difference between the generated-voltage present command value Vnow* and the generated-voltage past command value Vpast* is the same as or smaller than the predetermined value Vsub # th, or it may be determined whether or not the difference between the generated-voltage present command value Vnow* and the generated-voltage past command value Vpast* is smaller than the predetermined value Vsub # th. In these cases, the result "Yes" of the determination in the step S201 in FIG. 7 may be replaced by "No", and vice versa.

As described above, in the power-generation control apparatus, for an in-vehicle electric rotating machine, according to Embodiment 2 of the present invention, even in the case where the present generated-voltage command largely changes from the past generated-voltage command, the power-generation amount suppression level is not changed by the past generated-voltage command value; therefore, a range in which rapid charging is required can be set. For example, as described above, when the state of the power-generation control apparatus transits from the power-generation interruption state where the past generated-voltage command value is 12.0 V to the normal power-generation state where the generated-voltage command value is 14.4 V, the power-generation amount is suppressed in a conventional manner without rapid charging being performed, so that the load on the engine can gradually be increased; thus, the power-generation control apparatus can contribute to the stability of the engine.

Embodiment 3

In the power-generation control apparatus, for an in-vehicle electric rotating machine, according to Embodiment 3 of the present invention, the contents of the steps S205 and S212 in the flowchart of FIG. 7 according to Embodiment 2 are changed. In addition, the configuration of a vehicle equipped with a power-generation control apparatus for an in-vehicle electric rotating machine according to Embodiment 3 of the present invention and the configuration of the power-generation control apparatus for an in-vehicle electric rotating machine are the same as those illustrated in FIGS. 1 and 2, respectively, in Embodiment 1.

In FIG. 7, the step S203 is followed by the step S204, where the value of a decrement counter, which is a predetermined-time counter for changing the power-generation amount suppression level only for a predetermined time, is set to a predetermined value; next, the step S204 is followed by the step S205, where a constant, which is the power-generation amount suppression non-operation start determination threshold value for prohibiting the power-generation amount suppression operation, is set in accordance with a specification A described below.

In general, the mechanical output of an engine increases in the high rotation speed region; therefore, in the high rotation speed region, no rotation fluctuation is induced by the mechanical output of the electric power generator. Accordingly, by setting a threshold value based on the rotation speed of the engine, the power-generation amount suppression operation and the power-generation amount suppression non-operation can be exchanged with each other. In the power-generation control apparatus, for an in-vehicle electric rotating machine, according to Embodiment 3 of the present invention, a threshold value for performing the exchange between the power-generation amount suppression operation and the power-generation amount suppression non-operation is set based on the rotation speed of an engine. In addition, the threshold value may be set based on the rotation speed of an in-vehicle electric rotating machine.

Figure 8:
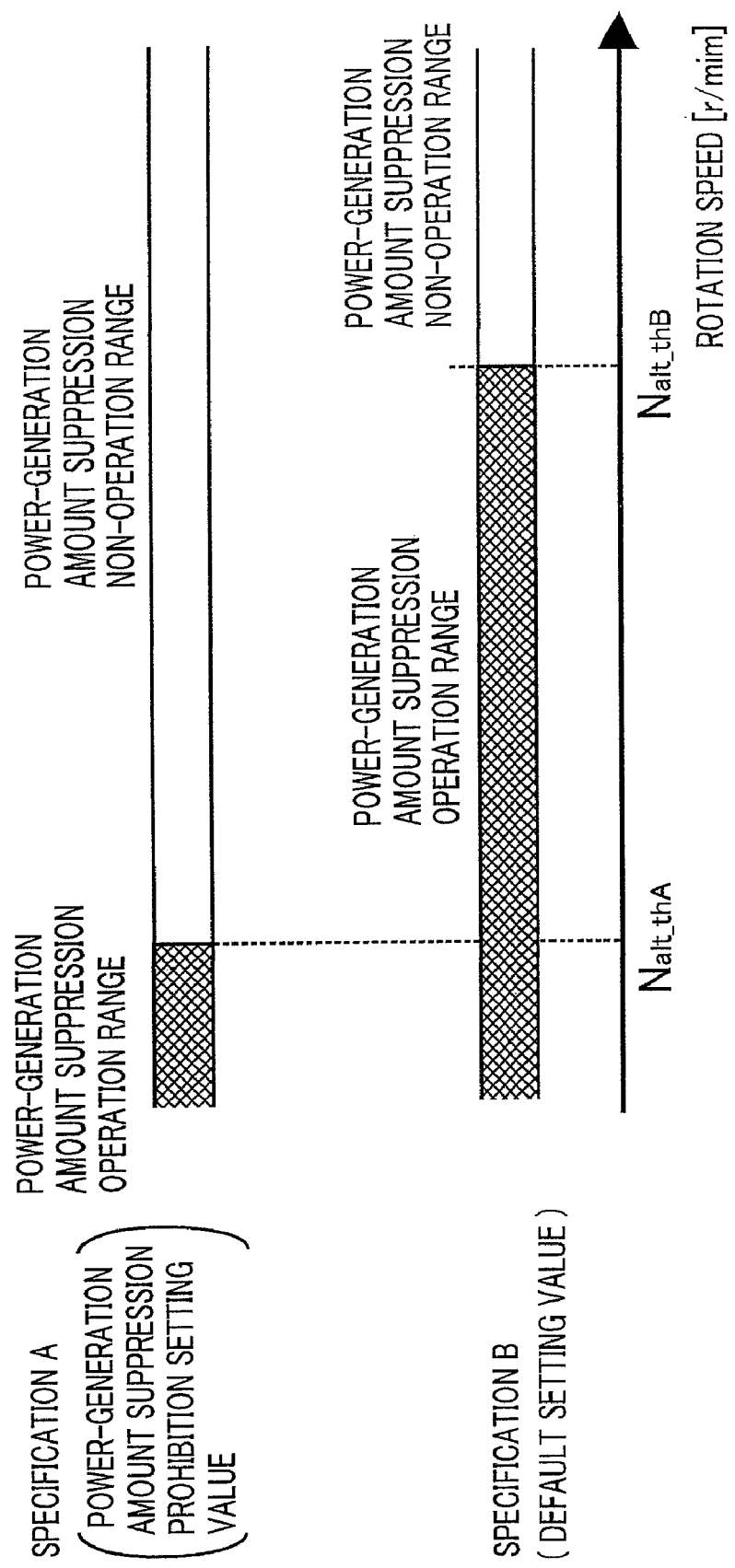
FIG. 8 is an explanatory chart representing an example of setting of an operation-prohibition determination threshold value in a power-generation control apparatus, for an in-vehicle electric rotating machine, according to Embodiment 3 of the present invention.

FIG. 8 is an explanatory chart representing an example of setting of a power-generation amount suppression non-operation start determination threshold value in a power-generation control apparatus, for an in-vehicle electric rotating machine, according to Embodiment 3 of the present invention. In FIG. 8, the specification B represents a default setting value; the power-generation amount suppression non-operation start determination threshold value Nalt # thB is set in such a way that, in order to stabilize the rotation of an engine, in a region where the rotation speed of the engine is low, the power-generation control apparatus comes into the power-generation amount suppression operation range in which the power-generation amount suppression operation is operated, and at an engine rotation speed where the output of the engine is larger than the power-generation torque of the electric rotating machine 102, the power-generation control apparatus comes into the power-generation amount suppression non-operation range where the power-generation amount suppression operation is cancelled, i.e., the power-generation amount suppression operation is prohibited.

In the specification A, the power-generation amount suppression non-operation start determination threshold value Nalt # thA is set in such a way that, in order to perform rapid charging, even in the case where the rotation speed of the engine is low, the power-generation control apparatus comes into the power-generation amount suppression non-operation range. In addition, the power-generation amount suppression non-operation start determination threshold value Nalt # thB according to the default specification B is extremely larger than the power-generation amount suppression non-operation start determination threshold value Nalt # thA according to the specification A.

For simplicity of the explanation, each of the power-generation amount suppression non-operation start determination threshold values represented in FIG. 8 has no hysteresis property; however, it goes without saying that, for the stability of the control, the hysteresis property may be added. Moreover, the operation-prohibition determination threshold value may be set based on the rotation speed of the in-vehicle electric rotating machine, instead of the rotation speed of the engine.

Next, the operation will be explained by use of specific numerical values. Here, the predetermined value Vsub # th to be compared with the difference between the generated-voltage present command value Vnow* and the generated-voltage past command value Vpast* is set to 1.0 V; the first setting threshold value Vpast # th1 is set to 13.0 V, and the second setting threshold value Vpast # th2 is set to 14.0 V; and there will be assumed a transition from the power-generation interruption state to the normal power-generation state, such as a transition from the engine start state or the acceleration state to the constant-speed state. In this transition state, it is preferable to perform the power-generation amount suppression operation as usual.

Here, it is assumed that external control apparatus 105 outputs a command signal for the transition from the power-generation interruption state to the normal power-generation state, and that there is performed a generated-voltage change for changing the state of the power-generation control apparatus from the power-generation interruption state where the generated-voltage past command value Vpast* is 12.0 V to the normal power-generation state where the generated-voltage present command value Vnow* is 14.4 V. Because the equation (Vnow*−Vpast*≧Vsub # th) is satisfied, the outcome of the determination in the step S201 in FIG. 7 becomes "Yes", and hence the step S201 is followed by the step S202; however, because the equation (Vpast # th1≦Vpast*≦Vpast # th2) is not satisfied, the outcome of the determination in the step S202 becomes "No"; thus, the step S202 is followed by the step S211, and then the step S211 is followed by the step S212.

Accordingly, the power-generation amount suppression change is not performed, and there is selected the power-generation amount suppression non-operation start determination threshold value Nalt # thB according to the default specification B in FIG. 8. As a result, because the power-generation amount suppression is securely performed, a comfortable and high-reliability in-vehicle electric rotating machine can be provided.

Next, a transition from the charge-discharge balanced state to the rapid charging state will be assumed. In this transition state, in order to securely perform the rapid charging, it is preferable to prohibit the power-generation amount suppression operation. Here, it is assumed that external control apparatus 105 outputs a command signal for the transition from the charge-discharge balanced state to the rapid charging state, and that there is performed a generated-voltage change for changing the state of the power-generation control apparatus from the charge-discharge balanced state where the generated-voltage past command value Vpast* is 13.5 V to the rapid charging state where the generated-voltage present command value Vnow* is 15.0 V. Because both the equation (Vnow*−Vpast*≧Vsub # th) and the equation (Vpast # th1≦Vpast*≦Vpast # th2) are satisfied, the step S202 in FIG. 7 is followed by the step S203; the step S203 is followed by the step S204; and then the step S204 is followed by the step S205.

Accordingly, the power-generation amount suppression change is performed, and there is selected the power-generation amount suppression non-operation start determination threshold value Nalt # thA according to the specification A in FIG. 8. Thus, because the power-generation amount suppression is set to be prohibited even in the case where the rotation speed is low, the power-generation amount suppression operation is immediately prohibited; therefore, short-time rapid charging is also securely performed.

Furthermore, a transition from the charge-discharge balanced state to the normal power-generation state will be assumed. In this transition state, it is preferable to perform the power-generation amount suppression operation as usual. Here, it is assumed that external control apparatus 105 outputs a command signal for the transition from the charge-discharge balanced state to the normal power-generation state, and that there is performed a generated-voltage change for changing the state of the power-generation control apparatus from the charge-discharge balanced state where the generated-voltage past command value Vpast* is 13.5 V to the normal power-generation state where the generated-voltage present command value Vnow* is 14.4 V. Because the equation (Vnow*−Vpast*≧Vsub # th) is not satisfied, the outcome of the determination in the step S201 in FIG. 7 becomes "No".

Accordingly, the step S201 is followed by the step S211, and then by the step S212; the power-generation amount suppression level is not changed, and the default specification B is selected. In addition, although the equation (Vpast # th1≦Vpast*≦Vpast # th2) is satisfied, the step S201 is not followed by the step S202, as described above; therefore, the determination in the step S202 is not performed. As a result, as is the case with a vehicle in which conventional power-generation amount suppression operation is performed, a comfortable and high-reliability in-vehicle electric rotating machine can be provided.

Other configurations are the same as those in Embodiment 2.

As described above, in the power-generation control apparatus, for an in-vehicle electric rotating machine, according to Embodiment 3 of the present invention, even in the case where the present generated-voltage command largely changes from the past generated-voltage command, the power-generation amount suppression level is not changed by the past generated-voltage command value; therefore, a range in which rapid charging is required can be set. For example, as described above, when the state of the power-generation control apparatus transits from the power-generation interruption state where the past generated-voltage command value is 12.0 V to the normal power-generation state where the generated-voltage command value is 14.4 V, the power-generation amount is suppressed in a conventional manner without rapid charging being performed, so that the load on the engine can gradually be increased; thus, the power-generation control apparatus can contribute to the stability of the engine.

Embodiment 4

Figure 9:
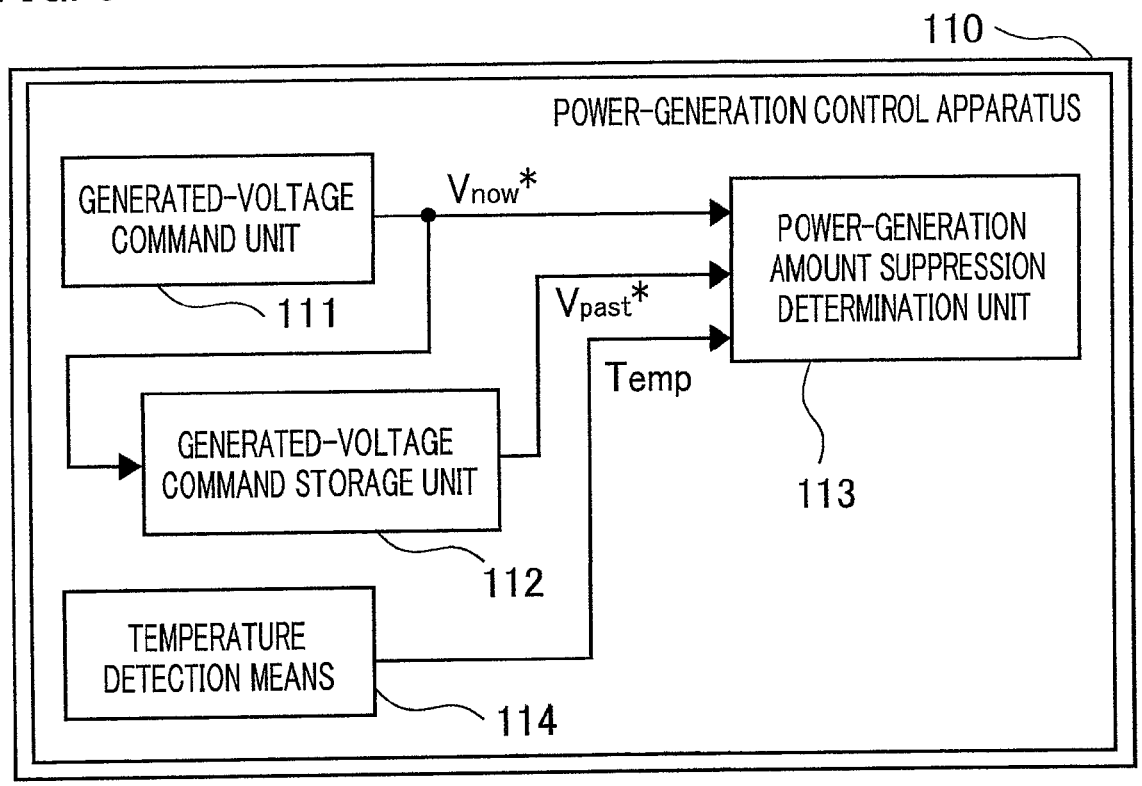
FIG. 9 is a block diagram illustrating the configuration of a power-generation control apparatus, for an in-vehicle electric rotating machine, according to Embodiment 4 of the present invention.

FIG. 9 is a block diagram illustrating a power-generation control apparatus for an in-vehicle electric rotating machine according to Embodiment 4 of the present invention. The block diagram of an in-vehicle electric rotating machine, to which a power-generation control apparatus for an in-vehicle electric rotating machine according to Embodiment 4 of the present invention is applied, is the same as the block diagram illustrated in FIG. 1. In addition, as the in-vehicle electric rotating machine 102, a coil-magnetic-field synchronous power generator is utilized.

In FIG. 9, a power-generation control apparatus 110 is provided with a generated-voltage command unit 111, a generated-voltage command storage unit 112, a power-generation amount suppression determination unit 113, and a temperature detection means 114 that detects the temperature of the in-vehicle electric rotating machine 102.

The temperature detection means 114 detects the temperature of the in-vehicle electric rotating machine 102 and inputs the detected temperature Temp to the power-generation amount suppression determination unit 113. As the temperature detection means 114, which is of a common type, a device such as a thermistor and a means to which the temperature dependency of the forward voltage drop characteristic of a diode is applied are utilized. Other configurations are the same as those in FIG. 2.

Figure 10:
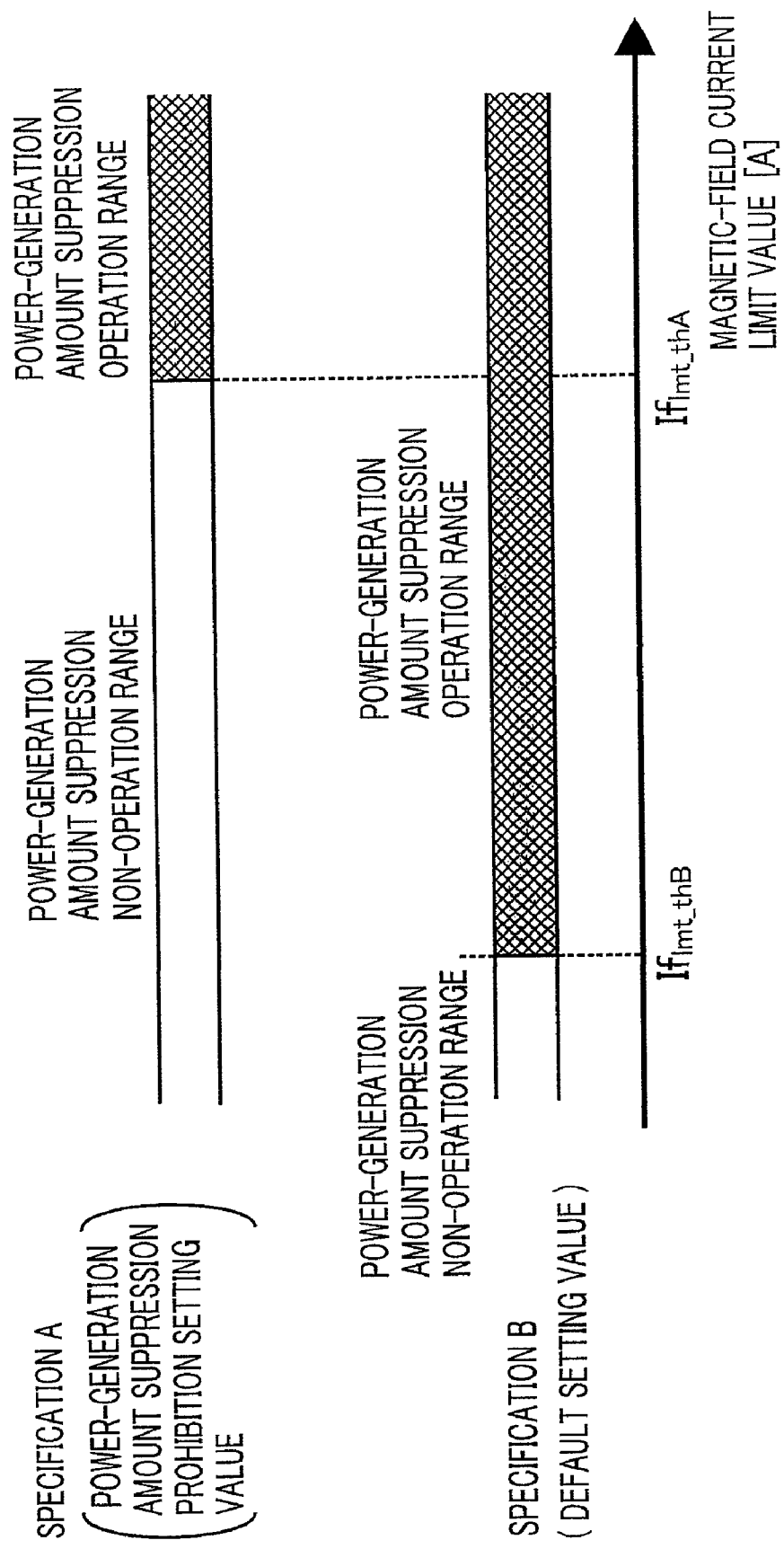
FIG. 10 is an explanatory chart representing an example of setting of an operation-start determination threshold value in a power-generation control apparatus, for an in-vehicle electric rotating machine, according to Embodiment 4 of the present invention.

FIG. 10 is an explanatory chart representing an example of setting of a power-generation amount suppression operation start threshold value according to Embodiment 4 of the present invention. In Embodiment 4 of the present invention, as the in-vehicle electric rotating machine 102, a coil-magnetic-field synchronous power generator is utilized; in a synchronous power generator of this type, the main magnetic flux is proportional to the amount of a magnetic-field current If that flows in the magnetic-field winding. Accordingly, an operation-start determination threshold value for starting the power-generation amount suppression control represented in FIG. 10 is determined based on the magnetic-field current If of the in-vehicle electric rotating machine 102; the power-generation amount suppression is performed when the magnetic-field current If exceeds a predetermined value.

In the specification A represented in FIG. 10, a power-generation amount suppression operation start determination threshold value Iflmt # thA is set to a relatively large value of the magnetic-field current; in the specification B, a default setting value is utilized, and the power-generation amount suppression operation start determination threshold value Iflmt # thB is set to a value that is extremely smaller than the power-generation amount suppression operation start determination threshold value Iflmt # thA (Iflmt # thA>>Iflmt # thB) according to the specification A.

In FIG. 10, in the specification A, when the magnetic-field current If exceeds the power-generation amount suppression operation start determination threshold value Iflmt # thA, the power-generation amount suppression operation is started, so that the power-generation control apparatus comes into the power-generation amount suppression operation range; until the magnetic-field current If exceeds the power-generation amount suppression operation start determination threshold value Iflmt # thA, the power-generation control apparatus is in the power-generation amount suppression non-operation range in which the power-generation amount suppression operation is prohibited. In contrast, in the default specification B represented in FIG. 10, normal power-generation amount suppression operation is performed; when the magnetic-field current If exceeds the power-generation amount suppression operation start determination threshold value Iflmt # thB, the power-generation amount suppression operation is started, so that the power-generation control apparatus comes into the power-generation amount suppression operation range; until the magnetic-field current If exceeds the power-generation amount suppression operation start determination threshold value Iflmt # thB, the power-generation control apparatus is in the power-generation amount suppression non-operation range in which the power-generation amount suppression operation is prohibited.

In addition, in general, the amount of the magnetic-field current If that flows in the magnetic-field winding is adjusted through a PWM modulation method. According to this method, the magnetic-field current If is proportional to the duty ratio of the PWM. Accordingly, changing the setting value of the magnetic-field current If is equivalent to changing the duty ratio of the PWM for controlling the magnetic-field current If. Thus, as represented in FIG. 11, the power-generation amount suppression operation start determination threshold value may be set based on the duty ratio of the PWM, instead of the magnetic-field current If.

Figure 11:
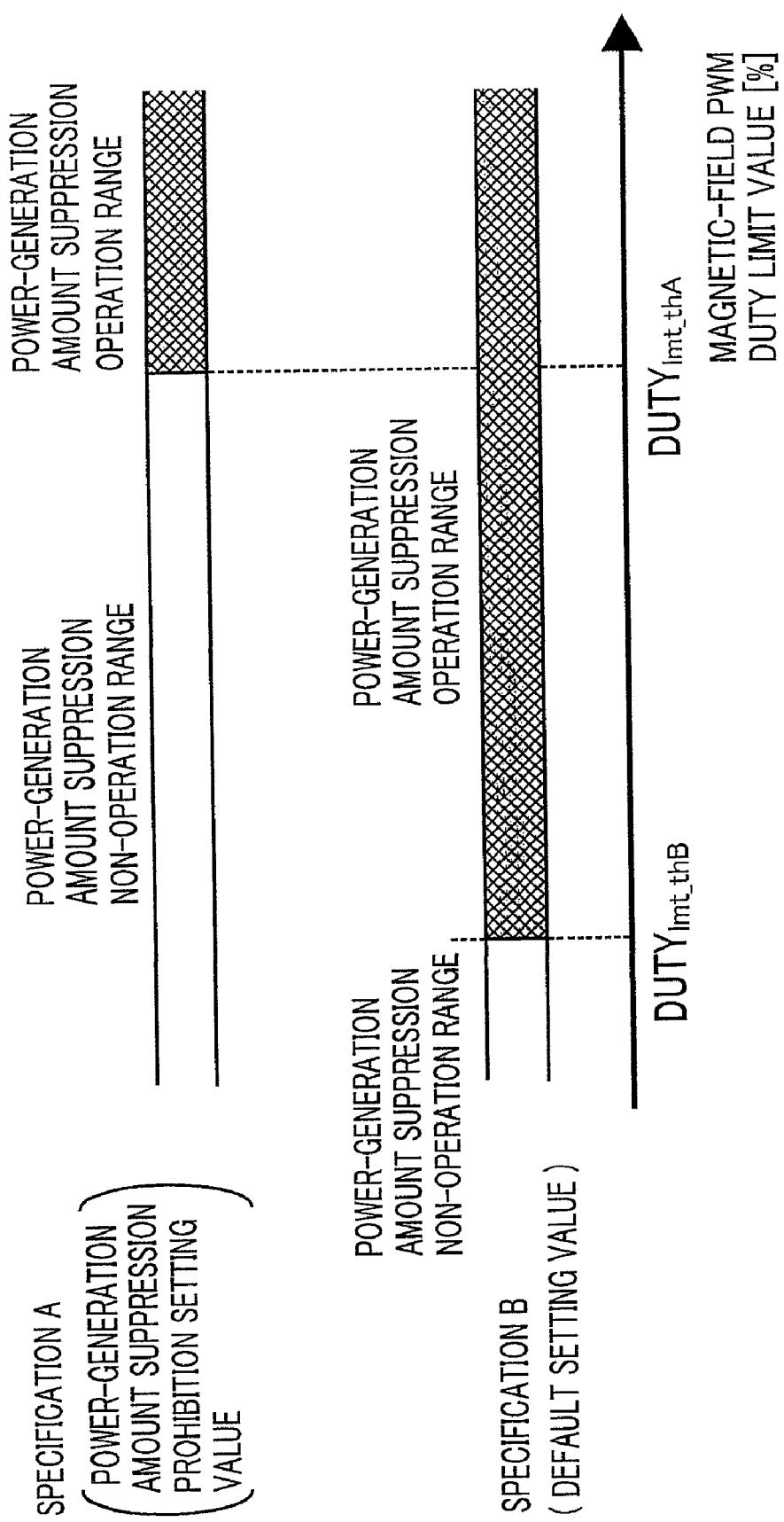
FIG. 11 is an explanatory chart representing another example of setting of an operation-start determination threshold value in a power-generation control apparatus, for an in-vehicle electric rotating machine, according to Embodiment 4 of the present invention.

That is to say, in FIG. 11, in the specification A, when the duty ratio of the PWM exceeds the power-generation amount suppression operation start determination threshold value DUTYlmt # thA, the power-generation amount suppression operation is started, so that the power-generation control apparatus comes into the power-generation amount suppression operation range; until the duty ratio of the PWM exceeds the power-generation amount suppression operation start determination threshold value DUTYlmt # thA, the power-generation control apparatus is in the power-generation amount suppression non-operation range in which the power-generation amount suppression operation is prohibited. In contrast, in the default specification B, normal power-generation amount suppression operation is performed; when the duty ratio of the PWM exceeds the power-generation amount suppression operation start determination threshold value DUTYlmt # thB, the power-generation amount suppression operation is started, so that the power-generation control apparatus comes into the power-generation amount suppression operation range; until the duty ratio of the PWM exceeds the power-generation amount suppression operation start determination threshold value DUTYlmt # thB, the power-generation control apparatus is in the power-generation amount suppression non-operation range in which the power-generation amount suppression operation is prohibited.

In this case, the power-generation amount suppression operation start determination threshold value DUTYlmt # thA according to the specification A and the power-generation amount suppression operation start determination threshold value DUTYlmt # thB according to the specification B are selected in such a way that the equation (DUTYlmt # thA>>DUTYlmt # thB) is satisfied.

Figure 12:
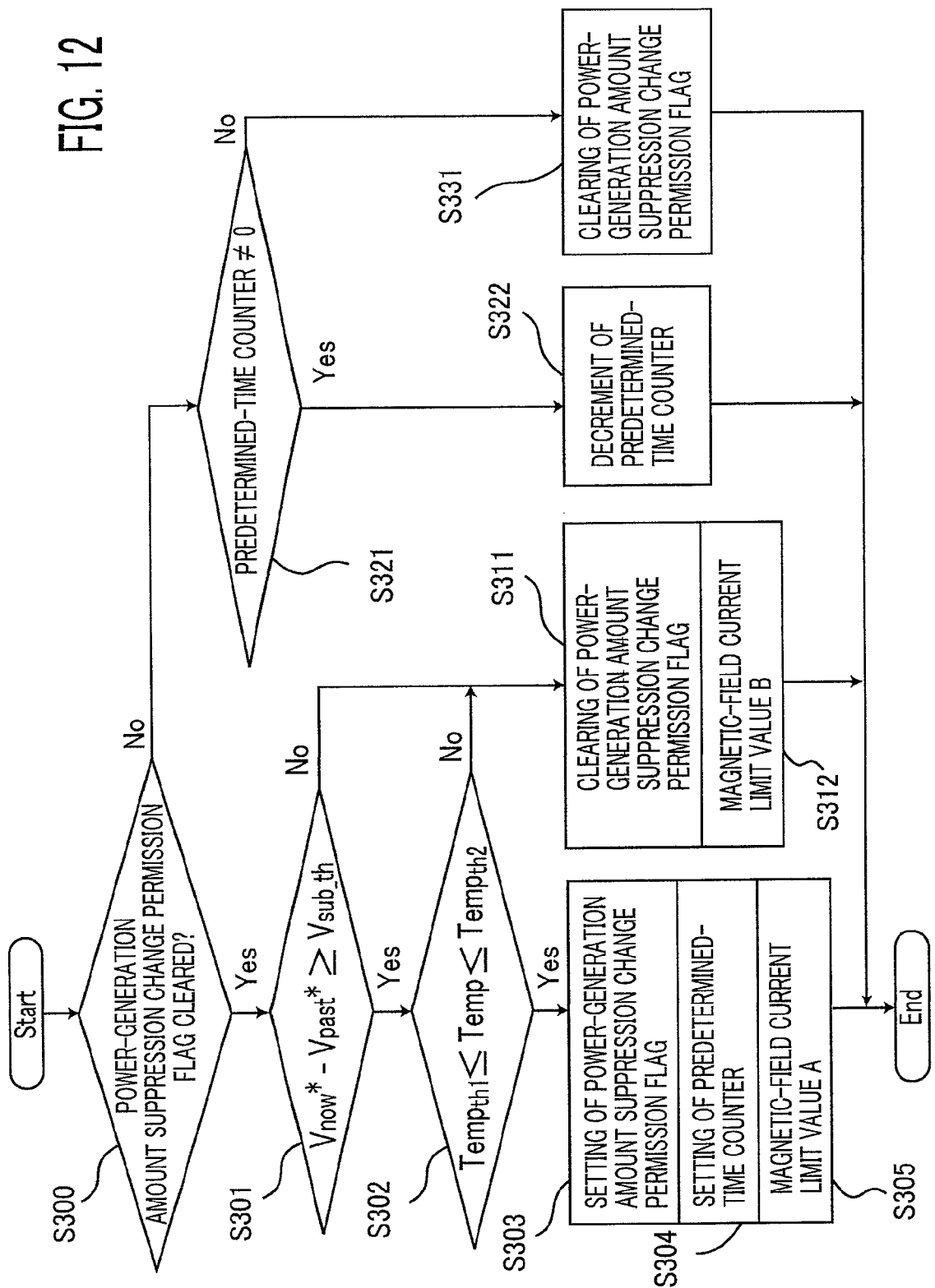
FIG. 12 is a flowchart representing the operation of a power-generation amount suppression determination unit in a power-generation control apparatus, for an in-vehicle electric rotating machine, according to Embodiment 4 of the present invention.

For simplicity of the explanation, each of the power-generation amount suppression operation start determination threshold values represented in FIGS. 11 and 12 has no hysteresis property; however, for the stability of the control, the hysteresis property may be added.

FIG. 12 is a flowchart representing the operation of the power-generation amount suppression determination unit in a power-generation control apparatus, for an in-vehicle electric rotating machine, according to Embodiment 4 of the present invention. The flowchart represented in FIG. 12 is differentiated from the flowchart in FIG. 5 or 7 for explaining the operation of Embodiment 1 or 3, respectively, by the steps S301 and S302 in each of which conditional determination for changing the power-generation amount suppression level is performed and the steps S305 and S312 in each of which the power-generation amount suppression level is changed.

In FIG. 12, at the initial time instant, the foregoing default specification B has been set in the power-generation control apparatus 110. In the step S300, it is determined whether or not the power-generation amount suppression level has been changed; in the case where the power-generation amount suppression level has not been changed, i.e., in the case where it is determined that the power-generation amount suppression change permission flag has been cleared, the outcome of the determination becomes "Yes", and the step S300 is followed by the step S301. In the step S301, it is determined whether or not the difference between the generated-voltage present command value Vnow* generated by the generated-voltage command unit 111 and the N-times-prior generated-voltage past command value Vpast* fed from the generated-voltage command storage unit 112 is the same as or larger than the predetermined value Vsub # th.

In addition, it has been explained that, in the step S301, it is determined whether or not the difference between the generated-voltage present command value Vnow* and the generated-voltage past command value Vpast* is the same as or larger than the predetermined value Vsub # th; however, the determination condition is not limited thereto, and it may be determined whether or not the difference between the generated-voltage present command value Vnow* and the generated-voltage past command value Vpast* is larger than the predetermined value Vsub # th.

Moreover, it may be determined whether or not the difference between the generated-voltage present command value Vnow* and the generated-voltage past command value Vpast* is the same as or smaller than the predetermined value Vsub # th, or it may be determined whether or not the difference between the generated-voltage present command value Vnow* and the generated-voltage past command value Vpast* is smaller than the predetermined value Vsub # th. In these cases, the result "Yes" of the determination in the step S201 in FIG. 12 may be replaced by "No", and vice versa.

In addition, with regard to the generated-voltage past command value Vpast* outputted from the generated-voltage command storage unit 112, the N-times-prior generated-voltage past command value may be replaced by a moving-average value of latest generated-voltage past command values accumulated a predetermined times or by a moving-average value of all accumulated generated-voltage past command values. In this case, by making a moving average, an erroneous determination based on an immediately previous power-generation command error caused by noise or the like is eliminated so that a stable power-generation amount suppression determination can be performed; therefore, it is made possible to reinforce the power-generation amount suppression determination against disturbance.

In the case where, in the step S301, it is determined that the difference between the generated-voltage present command value Vnow* and the N-times-prior generated-voltage past command value Vpast* is the same as or larger than the predetermined value Vsub # th, the outcome of the determination becomes "Yes", and the step S301 is followed by the step S302. In the step S302, it is determined whether or not the detected temperature Temp of the electric rotating machine detected by the temperature detection means 114 is within the range from a first predetermined temperature value Tempth1 to a second predetermined temperature value Tempth2 (Tempth1≦Temp≦Tempth2), i.e., within a predetermined range.

In this determination, in the case where the temperature Temp of the electric rotating machine 102 is within the predetermined range, the outcome of the determination becomes "Yes", and the step S302 is followed by the step S303, where there is set the power-generation amount suppression change permission flag for changing the power-generation amount suppression level. After that, the step S303 is followed by the step S304, where the value of a decrement counter, which is a predetermined-time counter for changing the power-generation amount suppression level only for a predetermined time, is set to a predetermined value; next, in the step S305, a constant for starting the power-generation amount suppression operation is set in accordance with a specification A described above. In Embodiment 4 of the present invention, the power-generation amount suppression operation start determination threshold value is set based on the magnetic-field current If, of the electric rotating machine 102, represented in FIG. 10 or the duty ratio of the PWM represented in FIG. 11; thus, the power-generation amount suppression operation start determination threshold value may be referred to also as a magnetic-field current limit threshold value.

In contrast, in the case where, in the step S301, it is determined that the difference between the generated-voltage present command value Vnow* and the N-times-prior generated-voltage past command value Vpast* fed from the generated-voltage command storage unit 112 is smaller than the predetermined value Vsub # th, or in the case where, in the step S302, it is determined that the temperature Temp of the electric rotating machine 102 is not within the predetermined range, the outcome of the determination becomes "No", and the step S301 is followed by the step S311, where the power-generation amount suppression change permission flag is cleared; next, in the step S312, the magnetic-field current limit threshold value is replaced by a constant B, which is a default specification.

Next, the operation will be explained by use of specific numerical values. Here, there is assumed a case in which the predetermined value Vsub # th, which is compared with the difference between the generated-voltage present command value Vnow* and the N-times-prior generated-voltage past command value Vpast*, is set to 0.6 V, the first and second predetermined temperature values Tempth1 and Tempth2 for the electric rotating machine are set to 0° C. and 50° C., respectively, and the normal power-generation state is replaced by the rapid charging state.

When the detected temperature Temp of the in-vehicle electric rotating machine is −10° C., it is assumed that there is performed a generated-voltage change for changing the state of the power-generation control apparatus from the normal power-generation state where the generated-voltage past command value Vpast* is 14.4 V to the rapid charging state where the generated-voltage present command value Vnow* is 15.0 V. Because the equation (Vnow*−Vpast*≧Vsub # th) is satisfied, the step S301 is followed by the step S302; however, because the equation (Tempth1≦Temp≦Tempth2) is not satisfied, the outcome of the determination in the step S302 becomes "No"; thus, the step S302 is followed by the step S311, and then by the step S312. Accordingly, the operation-start determination threshold value becomes the operation-start determination threshold value Iflmt # thB according to the default specification B represented in FIG. 10, or the power-generation amount suppression operation start determination threshold value DUTYlmt # thB according to the default specification B represented in FIG. 11; therefore, the power-generation amount suppression change is not performed.

As a result, in a range where the detected temperature Temp of the in-vehicle electric rotating machine 102 is low, i.e., in a range where, because of its low temperature, the engine 101 unstably rotates, the power-generation amount suppression control can securely be performed with a configuration that can be formed with the in-vehicle electric rotating machine 102, without utilizing an unnecessary temperature sensor.

In contrast, the detected temperature Temp of the in-vehicle electric rotating machine 102 is 100° C., both the equation (Vnow*−Vpast*≧Vsub # th) and the equation (Tempth1≦Temp≦Tempth2) are satisfied; therefore, the step S302 is followed by the step S303, where the power-generation amount suppression permission flag is set. In the step S304, a decrement counter, which is a predetermined-time counter, is set to a predetermined value, and in the step S305, the operation-start determination threshold value becomes the power-generation amount suppression operation start determination threshold value Iflmt # thA according to the specification A represented in FIG. 10, or the power-generation amount suppression operation start determination threshold value DUTYlmt # thA according to the specification A represented in FIG. 11; then, the power-generation amount suppression level is changed. As a result, until the operation-start determination threshold value exceeds the power-generation amount suppression operation start determination threshold value Iflmt # thA or the power-generation amount suppression operation start determination threshold value DUTYlmt # thA, the power-generation amount suppression operation is prohibited; therefore, the rapid charging can be performed.

The steps S321, S322, and S331 in the flowchart represented in FIG. 10 are the same as the respective steps S121, S122, and S131 in the flowchart represented in FIG. 5, or the respective steps S221, S222, and S231 in the flowchart represented in FIG. 7; thus, explanations therefor will be omitted.

Other steps are the same as those in the case of Embodiment 1.

In the foregoing power-generation control apparatus for an in-vehicle electric rotating machine according to Embodiment 4 of the present invention, even in the case where the present generated-voltage command largely changes from the past generated-voltage command, the power-generation amount suppression level is not changed by the present temperature; therefore, for example, the power-generation control apparatus can be set in such a way that no rapid charging is performed when the engine is not stable due to an extremely low temperature thereof.

In general, in some of in-vehicle power generators, temperature compensation is preliminarily added in such a way that, in order to compensate low-temperature battery acceptability, the lower the temperature is, the higher the generated voltage becomes. In a system of this kind, the temperature compensation is superimposed on an arbitrary generated-voltage command when the temperature is low, and hence the difference between the generated-voltage present command value and the generated-voltage past command value becomes larger than a predetermined value; thus, unintentional rapid charging may be carried out. However, the power-generation control apparatus for an in-vehicle electric rotating machine according to Embodiment 4 of the present invention does not change the power-generation amount suppression level when the temperature is within a predetermined temperature range; therefore, the rapid charging can be prevented.

Various modifications and alterations of this invention will be apparent to those skilled in the art without departing from the scope and spirit of this invention, and it should be understood that this is not limited to the illustrative embodiments set forth herein.

What is claimed is:

1. A power-generation control apparatus, for an in-vehicle electric rotating machine, that controls a power-generation amount of the in-vehicle electric rotating machine coupled with an internal combustion engine, the power-generation control apparatus comprising:
   a generated-voltage command unit that generates a generated-voltage command value for the in-vehicle electric rotating machine;
   a generated-voltage command storage unit that stores the generated-voltage command value generated by the generated-voltage command unit; and
   a power-generation amount suppression determination unit that determines whether or not to change a power-generation amount suppression level for suppressing the power-generation amount, based on at least one of a present generation-voltage command value generated by the generated-voltage command unit and a generated-voltage past command value based on a past generated-voltage command value stored in the generated-voltage command storage unit.

2. The power-generation control apparatus for an in-vehicle electric rotating machine according to any claim 1, wherein the power-generation amount suppression determination unit compares a predetermined value with a difference between a present generated-voltage command value generated by the generated-voltage command unit and a generated-voltage past command value based on a past generated-voltage command value stored in the generated-voltage command storage unit, and determines that the power-generation amount suppression level is to be changed, in the case where the difference has a predetermined relationship with the predetermined value.

3. The power-generation control apparatus for an in-vehicle electric rotating machine according to claim 1, wherein the power-generation amount suppression determination unit compares a predetermined value with a difference between a present generated-voltage command value generated by the generated-voltage command unit and a generated-voltage past command value based on a past generated-voltage command value stored in the generated-voltage command storage unit, and determines that the power-generation amount suppression level is to be changed, in the case where the difference has a predetermined relationship with the predetermined value and the past generated-voltage command value is within a predetermined range.

4. The power-generation control apparatus for an in-vehicle electric rotating machine according to claim 1, wherein the power-generation amount suppression determination unit compares a predetermined value with a difference between a present generated-voltage command value generated by the generated-voltage command unit and a generated-voltage past command value based on a past generated-voltage command value stored in the generated-voltage command storage unit, and determines that the power-generation amount suppression level is to be changed, in the case where the difference has a predetermined relationship with the predetermined value and the temperature of the in-vehicle electric rotating machine is within a predetermined range.

5. The power-generation control apparatus for an in-vehicle electric rotating machine according to claim 1, wherein the generated-voltage past command value is a moving average of plurality of past generated-voltage command values.

6. The power-generation control apparatus for an in-vehicle electric rotating machine according to claim 1, wherein the generated-voltage past command value is a generated-voltage command value that is N times prior to the present generated-voltage command value.

7. The power-generation control apparatus for an in-vehicle electric rotating machine according to claim 1, wherein the generated-voltage command unit generates the generated-voltage command value, based on a generated-voltage command signal fed from an external control apparatus.

8. The power-generation control apparatus for an in-vehicle electric rotating machine according to claim 1, wherein the power-generation amount suppression level continues to be changed for a predetermined time period.

9. A power-generation control apparatus, for an in-vehicle electric rotating machine, that controls a power-generation amount of the in-vehicle electric rotating machine coupled with an internal combustion engine, the power-generation control apparatus comprising:
   a generated-voltage command unit that generates a generated-voltage command value for the in-vehicle electric rotating machine;
   a generated-voltage command storage unit that stores the generated-voltage command value generated by the generated-voltage command unit; and
   a power-generation amount suppression determination unit that determines whether or not to change a power-generation amount suppression level for suppressing the power-generation amount, based on at least one of a present generation-voltage command value generated by the generated-voltage command unit and a generated-voltage past command value based on a past generated-voltage command value stored in the generated-voltage command storage unit,
   wherein the power-generation amount suppression level is changed by altering a gradient for gradually increasing or gradually decreasing the power-generation amount.

10. A power-generation control apparatus, for an in-vehicle electric rotating machine, that controls a power-generation amount of the in-vehicle electric rotating machine coupled with an internal combustion engine, the power-generation control apparatus comprising:

a generated-voltage command unit that generates a generated-voltage command value for the in-vehicle electric rotating machine;

a generated-voltage command storage unit that stores the generated-voltage command value generated by the generated-voltage command unit; and a power-generation amount suppression determination unit that determines whether or not to change a power-generation amount suppression level for suppressing the power-generation amount, based on at least one of a present generation-voltage command value generated by the generated-voltage command unit and a generated-voltage past command value based on a past generated-voltage command value stored in the generated-voltage command storage unit, wherein the power-generation amount suppression level is changed by altering an operation-start determination threshold value for gradually increasing or decreasing the power-generation amount.

11. The power-generation control apparatus for an in-vehicle electric rotating machine according to claim 10, wherein the operation-start determination threshold value is set based on a rotation speed of the internal combustion engine or the in-vehicle electric rotating machine.

12. The power-generation control apparatus for an in-vehicle electric rotating machine according to claim 10, wherein the in-vehicle electric rotating machine is a coil-magnetic-field electric rotating machine, and the operation-start determination threshold value is set based on a magnetic-field current value of the in-vehicle electric rotating machine.

13. The power-generation control apparatus for an in-vehicle electric rotating machine according to claim 10, wherein the in-vehicle electric rotating machine is a coil-magnetic-field electric rotating machine, and the operation-start determination threshold value is set by changing a magnetic-field duty ratio for controlling the power-generation amount of the in-vehicle electric rotating machine.

* * * * *